US011010963B2

(12) United States Patent
Gruen

(10) Patent No.: US 11,010,963 B2
(45) Date of Patent: May 18, 2021

(54) REALISM OF SCENES INVOLVING WATER SURFACES DURING RENDERING

(71) Applicant: NVIDIA Corporation, Santa Clara, CA (US)

(72) Inventor: Holger Heinrich Gruen, Bavaria (DE)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 16/373,478

(22) Filed: Apr. 2, 2019

(65) Prior Publication Data

US 2019/0318533 A1    Oct. 17, 2019

Related U.S. Application Data

(60) Provisional application No. 62/658,534, filed on Apr. 16, 2018.

(51) Int. Cl.
*G06T 15/50*   (2011.01)
*G06T 17/20*   (2006.01)

(52) U.S. Cl.
CPC ............ *G06T 15/506* (2013.01); *G06T 17/20* (2013.01); *G06T 2210/21* (2013.01); *G06T 2210/24* (2013.01)

(58) Field of Classification Search
CPC ............................ G06T 15/506; G06T 2210/24
See application file for complete search history.

(56) References Cited

U.S. PATENT DOCUMENTS

| 8,638,331 | B1 * | 1/2014 | Jarosz | G06T 15/06 |
| | | | | 345/426 |
| 9,280,848 | B1 * | 3/2016 | Chen | G06T 15/60 |
| 2008/0143713 | A1 * | 6/2008 | Chiu | G06T 13/60 |
| | | | | 345/420 |
| 2009/0267951 | A1 * | 10/2009 | Chang | G06T 13/60 |
| | | | | 345/474 |
| 2012/0038644 | A1 | 2/2012 | Jones et al. | |

(Continued)

FOREIGN PATENT DOCUMENTS

CN          101930622 A       12/2010

OTHER PUBLICATIONS

Bo, Qin "A simple and quick method for rendering underwater optical effect", Computer Graphics, Imaging and Visualisation, 2007, pp. 49-53 (Year: 2007).*

(Continued)

*Primary Examiner* — Terrell M Robinson
(74) *Attorney, Agent, or Firm* — Zilka-Kotab, P.C.

(57) ABSTRACT

A water surface mesh is determined for a scene to be rendered. This water surface mesh includes a grouping of geometric shapes such as triangles that represents the surface of the water. This water surface mesh is then used to create a refracted or reflected mesh. The refracted or reflected mesh shows an effect produced by the water surface's refraction or reflection of light. The relationship between the water surface mesh and the refracted or reflected mesh is then used to determine how to illuminate elements within the scene. This eliminates some previously necessary steps during rendering, and enables an accurate depiction of caustics within a scene that can be performed in real-time.

14 Claims, 14 Drawing Sheets

(56) References Cited

U.S. PATENT DOCUMENTS

| | | | |
|---|---|---|---|
| 2014/0071155 A1* | 3/2014 | Pauly | G02B 27/0012 345/596 |
| 2017/0109920 A1* | 4/2017 | Jung | G06T 15/80 |
| 2017/0309064 A1 | 10/2017 | Zou et al. | |
| 2018/0012392 A1 | 1/2018 | Kryachko | |

OTHER PUBLICATIONS

Shuran, Yao, "Interactive Dynamic Water Surface Fast Rendering Algorithm", 2008 International Symposium on Information Science and Engineering, 2008, vol. 1, pp. 691-695 (Year: 2008).*

Reed, "Quick and Easy Gpu Random Numbers in D3D11," Nathan Reed's coding blog, Jan. 12, 2013, 10 pages. Retrieved from http://www.reedbeta.com/blog/quick-and-easy-gpu-random-numbers-in-d3d11/.

Baboud et al., "Realistic water volumes in real-time," Proceedings of the Second Eurographics Conference on Natural Phenomena, 2006, pp. 25-32. Retrieved from https://pdfs.semanticscholar.org/6e44/e744a00b32740439c255c652698189590dbe.pdf.

Golias et al., "Deep Water Animation and Rendering," Gamasutra, The Art & Business of Making Games, Sep. 26, 2001, 5 pages. Retrieved from <https://www.gamasutra.com/view/feature/131445/deep_water_animation_and_rendering.php>.

Jensen et al., "Realistic Image Synthesis Using Photon Mapping," A.K. Peters, Ltd., 2001, 36 pages. Retrieved from https://www.taylorfrancis.com/books/9781439863633.

Hu et al., "Interactive volume caustics in single-scattering media," Proc. 2010 ACM SIGGRAPH Symposium on Interactive 3D Graphics and Games (I3D '10), 2010, 10 pages. Retrieved from http://scholar.google.com/scholar_url?url=http://citeseerx.ist.psu.edu/viewdoc/download%3Fdoi%3D10.1.1.707.7112%26rep%3Drep1%26type%3Dpdf&hl=en&sa=X&scisig=AAGBfm2SJMPXtwy0okRcJYrI5INwkw4vfA&nossl=1&oi=scholarr.

Liktor et al, "Real-time volume caustics with adaptive beam tracing," Symposium on Interactive 3D Graphics and Games (I3D '11), 2011, 8 pages. Retrieved from http://scholar.google.com/scholar_url?url=http://citeseerx.ist.psu.edu/viewdoc/download%3Fdoi%3D10.1.1.701.395%26rep%3Drep1%26type%3Dpdf&hl=en&sa=X&scisig=AAGBfm0u-bJU2yc_dXf_ha5AFZSj0dn7ZQ&nossl=1&oi=scholarr.

Shah et al., "Caustics Mapping: An Image-Space Technique for Real-Time Caustics," IEEE Transactions on Visualization and Computer Graphics 13(2), Mar. 2007, 8 pages. Retrieved from graphics.cs.ucf.edu/old/caustics/caustics.pdf.

Szirmay-Kalos et al., "Approximate Ray-Tracing on the GPU with Distance Impostors," Computer Graphics Forum 24(3), 2005, 10 pages.

Wang et al., "An efficient GPU-based approach for interactive global illumination," ACM Trans. Graph. 28(3), Article 91, Jul. 2009, 8 pages. Retrieved from http://scholar.google.com/scholar_url?url=http://cseweb.ucsd.edu/~ravir/291/2015/papers/a91-wang.pdf&hl=en&sa=X&scisig=AAGBfm3ulxLhySilT4CSXvmT82XVYd6AIA&nossl=1&oi=scholarr.

Wyman et al., "Adaptive Caustic Maps Using Deferred Shading," Computer Graphics Forum 28(2), 2009, 10 pages. Retrieved from cwyman.org/papers/eg09_adaptiveCaustics_small.pdf.

International Search Report and Written Opinion from PCT Application No. PCT/US2019/027744, dated Jul. 2, 2019.

Shah et al., "Caustics Mapping: An Image-space Technique for Real-time Caustics," IEEE Transactions on Visualization and Computer Graphics, Mar. 2007, 11 pages.

* cited by examiner

REALISM OF SCENES INVOLVING WATER SURFACES DURING RENDERING

CLAIM OF PRIORITY

This application claims the benefit of U.S. Provisional Application No. 62/658,534 (Attorney Docket No. 18-MU-0095US01) titled "METHODS AND SYSTEMS FOR REFRACTED AND REFLECTED REAL-TIME CAUSTICS," filed Apr. 16, 2018, the entire contents of which is incorporated herein by reference.

FIELD OF THE INVENTION

The present invention relates to image rendering, and more particularly to accounting for surface caustics during image rendering.

BACKGROUND

Water surface caustics (e.g., light patterns generated by light refracted or reflected off of a water surface within a scene, etc.) affect the way objects above and below a water source are illuminated within a scene. Accounting for accurate water surface caustics during rendering is time and resource-intensive, and cannot currently be accurately performed in real-time. As a result, current real-time renderings result in unrealistic water surface caustics within a scene. There is therefore a need to more efficiently address realistic water surface caustics during rendering.

DETAILED DESCRIPTION

In computer graphics, water surface caustics are light patterns generated by light refracted or reflected off of a water surface within a scene to be rendered. These water surface caustics affect the way objects above and below a water source are illuminated within a scene. Since accounting for these caustics is time and resource-intensive and cannot currently be accurately performed in real-time, real-time renderings result in unrealistic water surface caustics within a scene.

To address this, a water surface mesh is determined for a scene to be rendered. This water surface mesh is a grouping of geometric shapes such as triangles that represents the surface of the water. This water surface mesh is then used to create a lighting mesh, where the lighting mesh is a refracted or reflected mesh. The lighting mesh shows an effect produced by the water surface's refraction or reflection of light. The relationship between the water surface mesh and the lighting mesh is then used to determine how to light elements within the scene. This eliminates some previously necessary steps during rendering, and enables an accurate depiction of caustics within a scene that can be performed in real-time.

Figure 1:
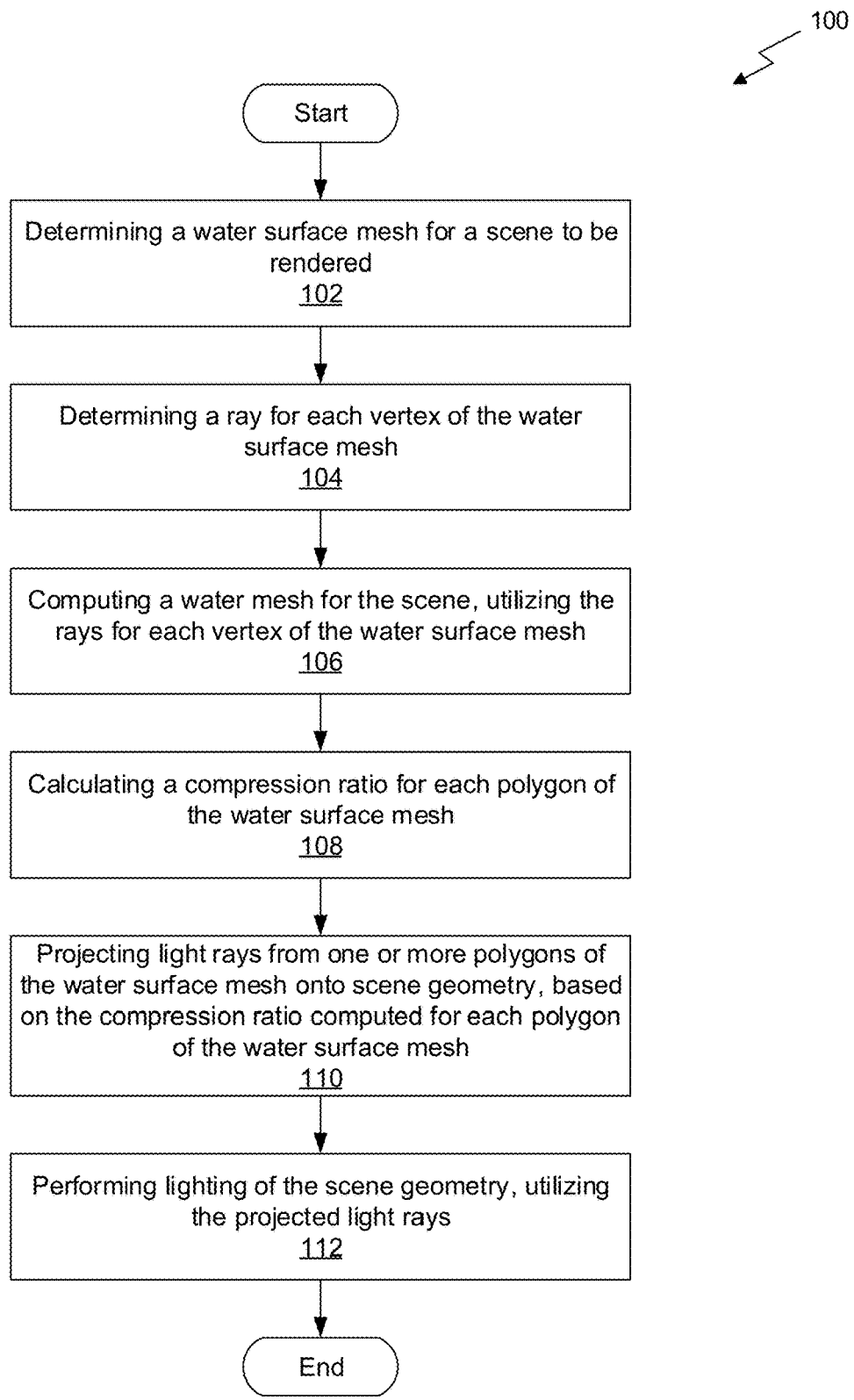
FIG. 1 illustrates a flowchart of a method for improving realism of scenes involving water surfaces during rendering, in accordance with an embodiment.

FIG. 1 illustrates a flowchart of a method 100 for improving a realism of scenes involving water surfaces during rendering, in accordance with an embodiment. Although method 100 is described in the context of a processing unit, the method 100 may also be performed by a program, custom circuitry, or by a combination of custom circuitry and a program. For example, the method 100 may be executed by a GPU (graphics processing unit), CPU (central processing unit), or any processor capable of performing parallel path space filtering by hashing. Furthermore, persons of ordinary skill in the art will understand that any system that performs method 100 is within the scope and spirit of embodiments of the present invention.

As shown in operation 102, a water surface mesh is determined for a scene to be rendered. In one embodiment, the water surface mesh includes a polygon mesh that represents a geometry of a water surface within the scene. In another embodiment, the water surface mesh includes a plurality of geometric instances (e.g., polygons such as triangles, etc.).

Additionally, as shown in operation 104, a ray is determined for each vertex of the water surface mesh. In one embodiment, the ray starts at a current position of the vertex of the water surface mesh. In another embodiment, the ray may include a refracted ray that points along a refracted direction of incident light. In another embodiment, the ray may include a reflected ray that points along a reflected direction of incident light. In still another embodiment, the ray is created by the light source of the scene hitting the vertex of the water surface mesh.

Further, in one embodiment, the ray may include a refracted ray that is created by tracing rays from the light source and identifying a refraction of the rays at the vertices of the water surface mesh. In another embodiment, the ray may include a reflected ray that is created by tracing rays from the light source and identifying a reflection of the rays at the vertices of the water surface mesh. In another embodiment, a direction of a refracted or reflected ray for a vertex of the water surface mesh is determined utilizing a surface normal calculated for the vertex.

Further still, as shown in operation 106, a water mesh is computed for the scene, utilizing the rays for each vertex of the water surface mesh. In one embodiment, the water mesh may include a refracted or reflected water mesh. In another embodiment, the water mesh has the same number of vertices and the same polygon count as the water surface mesh. In yet another embodiment, if the water mesh is a refracted water mesh, the positions of the vertices within the refracted water mesh are determined by intersecting each refracted ray with underwater geometry in the scene to be rendered. In still another embodiment, if the water mesh is a reflected water mesh, the positions of the vertices within the reflected water mesh are determined by intersecting each reflected ray with above-water geometry in the scene to be rendered. In another embodiment, every polygon of the water surface mesh generates a corresponding polygon in the refracted or reflected water mesh, based on the corresponding refracted or reflected rays starting at vertices of the water surface mesh.

Also, as shown in operation 108, a compression ratio is calculated for each polygon of the water surface mesh. In one embodiment, the compression ratio is computed based on the surface area of the polygon of the water surface mesh, and the surface area of the corresponding polygon within the (refracted or reflected) water mesh. In another embodiment, the compression ratio for each polygon of the water surface mesh may be stored within a buffer.

In addition, as shown in operation 110, light rays are projected from one or more polygons of the water surface mesh onto scene geometry, based on the compression ratio computed for each polygon of the water surface mesh. For example, if the water mesh is a refracted water mesh, refracted light rays are projected from one or more polygons of the water surface mesh onto underwater scene geometry, based on the compression ratio computed for each polygon of the water surface mesh. In another example, if the water mesh is a reflected water mesh, reflected light rays are projected from one or more polygons of the water surface mesh onto above-water scene geometry, based on the compression ratio computed for each polygon of the water surface mesh. In one embodiment, a number of refracted or reflected light rays projected/generated from one or more polygons of the water surface mesh may be based on the compression ratio for the polygons and/or a screen space size of the geometry of the water mesh.

Furthermore, in one embodiment, the compression ratio for a polygon of the water surface mesh may be compared to a predetermined threshold. For example, the predetermined threshold may have a value of one. In another embodiment, if the compression ratio does not exceed the threshold, the light through the polygon is being diffused, and no light rays may be projected/generated for the polygon of the water surface mesh. Alternately, a predetermined number of light rays may be projected/generated for the polygon of the water surface mesh (where the number is lower than polygons having compression ratios greater than the threshold).

Further still, in one embodiment, if the compression ratio exceeds the threshold, the light through the polygon is being concentrated/focused, and light rays may be projected/generated for the polygon of the water surface mesh. For example, the number of light rays that are projected/generated may be proportional to the compression ratio for the polygon. In another example, a first polygon with a first compression ratio may have more light rays projected/generated for the first polygon than a second polygon with a second compression ration less than the first compression ratio.

Also, in one embodiment, a number of light rays projected/generated from one or more polygons of the water surface mesh may be based on an on-screen size of corresponding polygons within the water mesh.

Additionally, in one embodiment, the light rays may be projected/generated from random positions within each polygon of the water surface mesh. For example, the random positions may be determined utilizing a random number sequence that uses a unique per-polygon ID as a random seed value. For instance, each polygon of the water surface mesh may be assigned a unique identifying number. In yet another example, the identifying number may be used as a seed value to generate random numbers.

For instance, the identifying number may be input into a pseudo-random number generator to generate a sequence of pseudo-random numbers. The same seed may always result in the same sequence of pseudo-random numbers from the pseudo-random number generator. This may ensure that a sequence of random positions within the within the polygon is the same each time for that polygon over multiple scenes/frames, which may stabilize noise positions within the polygons of the water surface mesh and may stabilize noise in general.

Further, in one embodiment, for each polygon of the water surface mesh, it may be determined whether each of the random positions determined for that polygon are visible from the light source of the scene. For example, this may be performed by comparing the random positions to a shadow map for the scene, shooting a ray from the random positions to the light source, etc.

Further still, in one embodiment, for each polygon of the water surface mesh for which light rays are to be projected/generated, light rays are projected/generated for each random position determined for that polygon that are visible from the light source of the scene. For example, light rays may be projected/generated by forming a ray (e.g., a photon, etc.) starting at each random position, along the interpolated refracted or reflected direction determined for the polygon.

Also, as shown in operation 112, lighting of the scene geometry is performed, utilizing the projected light rays. In one embodiment, for each polygon of the water surface mesh for which refracted light rays are to be projected/generated, an intersection of each projected/generated refracted light ray with underwater scene geometry is determined. In one embodiment, for each polygon of the water surface mesh for which reflected light rays are to be projected/generated, an intersection of each projected/generated reflected light ray with above-water scene geometry is determined. In another embodiment, each intersection is projected to a screen space location (e.g., pixel). For example, the intersection point may be projected onto a two-dimensional (2D) position as seen by a point of view of a camera viewing the scene (the screen space location).

In addition, in one embodiment, if it is determined that the screen space location is on-screen (e.g., visible on the screen, etc.), a brightness value for the screen space location is accumulated in a buffer. For example, for each pixel within the screen space, a screen space buffer may store accumulated brightness (e.g., as a floating-point value, etc.) from refracted rays for the pixel. In another example, the accumulated brightness for a pixel may be scaled by one or more factors (e.g., the associated compression ratio for the polygon of the water surface mesh, an amount of light absorbed by a length of the ray as it travels through the water, etc.).

Furthermore, in one embodiment, the accumulated brightness value stored in the buffer for each screen space location may be denoised to create a denoised and smoothed caustics buffer value for the screen space location. For example, denoising may be performed utilizing brightness blurring. In another embodiment, denoised and smoothed caustics buffer values for each screen space location (e.g., each pixel of the visible screen space) may be used to shed light onto the underwater or above-water scene, thereby performing lighting of the underwater or above-water scene geometry.

In this way, a refracted or reflected water mesh may act as a guiding mesh and may be used to determine a number and location of refracted or reflected rays to be projected/generated from a corresponding water surface mesh of a scene. Additionally, the refracted or reflected rays may be projected directly from the water surface mesh, instead of from a light source, which may eliminate a need for one or more intermediate rendering steps during rendering, which may improve a performance of one or more computing devices performing the rendering. Also, projecting the refracted or reflected rays directly from the water surface mesh may enable real-time ray tracing of the refracted or reflected rays to implement water surface caustics (e.g., light patterns generated by light refracted or reflected off of a water surface within a scene, etc.).

Figure 2:
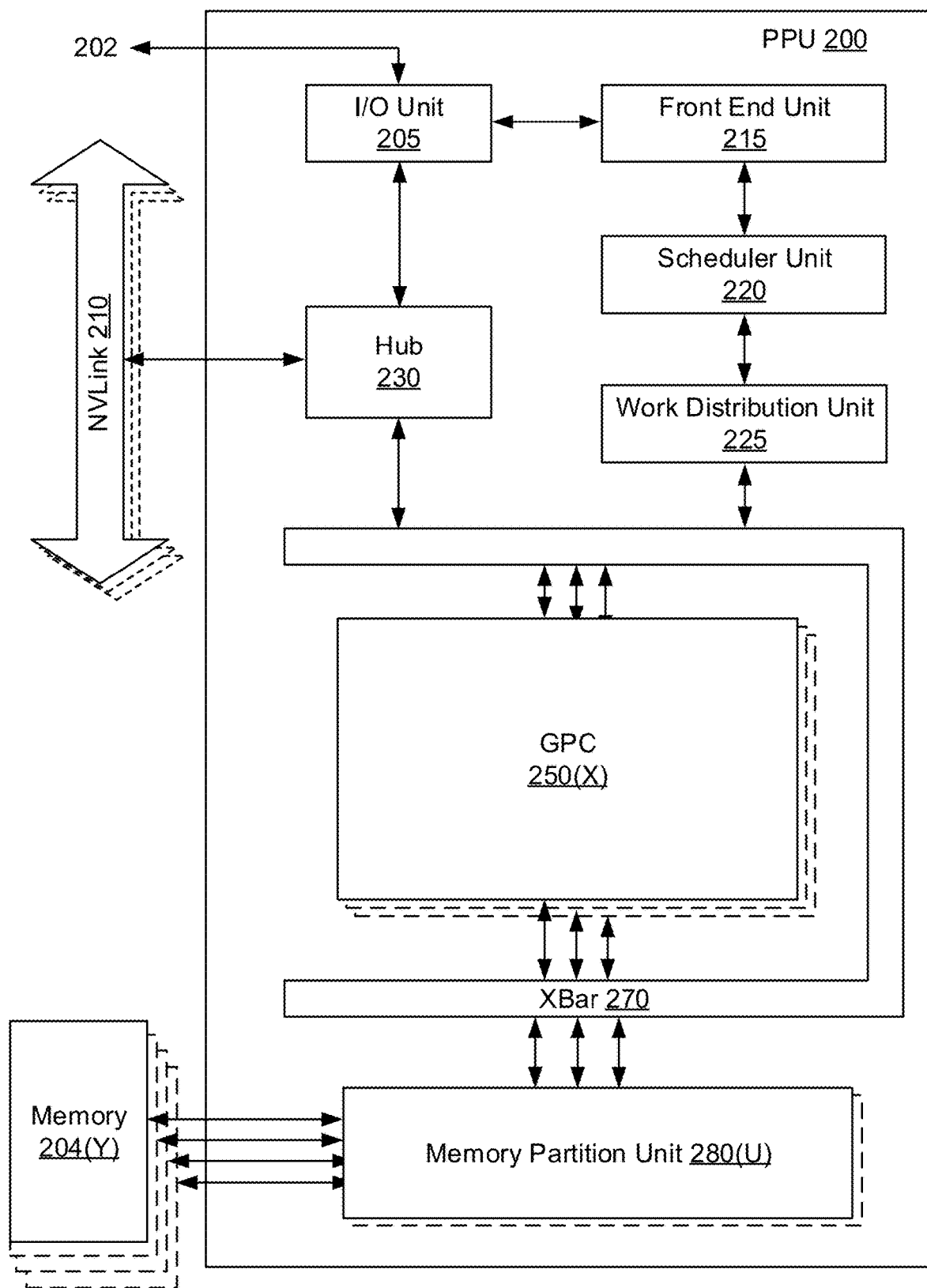
FIG. 2 illustrates a parallel processing unit, in accordance with an embodiment.

In yet another embodiment, the water mesh may be computed, and light ray projection may be performed, utilizing a parallel processing unit (PPU) such as the PPU 200 illustrated in FIG. 2.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

FIG. 2 illustrates a parallel processing unit (PPU) 200, in accordance with an embodiment. In an embodiment, the PPU 200 is a multi-threaded processor that is implemented on one or more integrated circuit devices. The PPU 200 is a latency hiding architecture designed to process many threads in parallel. A thread (i.e., a thread of execution) is an instantiation of a set of instructions configured to be executed by the PPU 200. In an embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 200 may be configured to accelerate thousands of High Performance Computing (HPC), data center, and machine learning applications. The PPU 200 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 2, the PPU 200 includes an Input/Output (I/O) unit 205, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other PPUs 200 via one or more high-speed NVLink 210 interconnect. The PPU 200 may be connected to a host processor or other peripheral devices via an interconnect 202. The PPU 200 may also be connected to a local memory comprising a number of memory devices 204. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 210 interconnect enables systems to scale and include one or more PPUs 200 combined with one or more CPUs, supports cache coherence between the PPUs 200 and CPUs, and CPU mastering. Data and/or commands may be transmitted by the NVLink 210 through the hub 230 to/from other units of the PPU 200 such as one or more copy engines, a video encoder, a video decoder, a power management unit, etc. (not explicitly shown). The NVLink 210 is described in more detail in conjunction with FIG. 4B.

The I/O unit 205 is configured to transmit and receive communications (i.e., commands, data, etc.) from a host processor (not shown) over the interconnect 202. The I/O unit 205 may communicate with the host processor directly via the interconnect 202 or through one or more intermediate devices such as a memory bridge. In an embodiment, the I/O unit 205 may communicate with one or more other processors, such as one or more the PPUs 200 via the interconnect 202. In an embodiment, the I/O unit 205 implements a Peripheral Component Interconnect Express (PCIe) interface for communications over a PCIe bus and the interconnect 202 is a PCIe bus. In alternative embodiments, the I/O unit 205 may implement other types of well-known interfaces for communicating with external devices.

The I/O unit 205 decodes packets received via the interconnect 202. In an embodiment, the packets represent commands configured to cause the PPU 200 to perform various operations. The I/O unit 205 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the I/O unit 205 is configured to route communications between and among the various logical units of the PPU 200.

In an embodiment, a program executed by the host processor encodes a command stream in a buffer that provides workloads to the PPU 200 for processing. A workload may comprise several instructions and data to be processed by those instructions. The buffer is a region in a memory that is accessible (i.e., read/write) by both the host processor and the PPU 200. For example, the I/O unit 205 may be configured to access the buffer in a system memory connected to the interconnect 202 via memory requests transmitted over the interconnect 202. In an embodiment, the host processor writes the command stream to the buffer and then transmits a pointer to the start of the command stream to the PPU 200. The front end unit 215 receives pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In an embodiment, the work distribution unit 225 manages a pending task pool and an active task pool for each of the GPCs 250. The pending task pool may comprise a number of slots (e.g., 32 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 may also be connected to the XBar 270 via the hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. The results can be transmitted to another PPU 200 or CPU via the NVLink 210. In an embodiment, the PPU 200 includes a number U of partition units 280 that is equal to the number of separate and distinct memory devices 204 coupled to the PPU 200. A partition unit 280 will be described in more detail below in conjunction with FIG. 3B.

In an embodiment, a host processor executes a driver kernel that implements an application programming interface (API) that enables one or more applications executing on the host processor to schedule operations for execution on the PPU 200. In an embodiment, multiple compute applications are simultaneously executed by the PPU 200 and the PPU 200 provides isolation, quality of service (QoS), and independent address spaces for the multiple compute applications. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 4A.

Figure 3A:
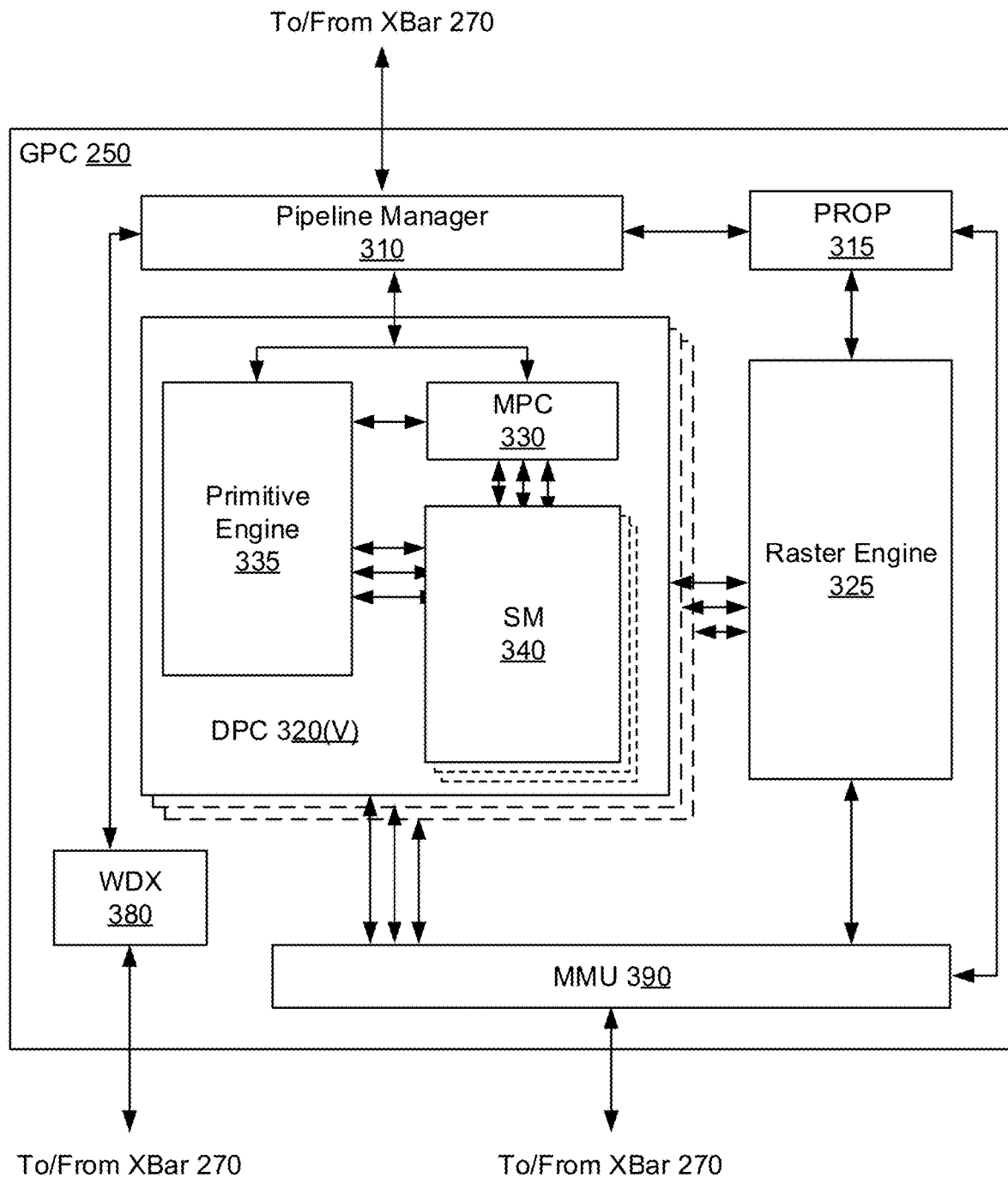
FIG. 3A illustrates a general processing cluster within the parallel processing unit of FIG. 2, in accordance with an embodiment.

FIG. 3A illustrates a GPC 250 of the PPU 200 of FIG. 2, in accordance with an embodiment. As shown in FIG. 3A, each GPC 250 includes a number of hardware units for processing tasks. In an embodiment, each GPC 250 includes a pipeline manager 310, a pre-raster operations unit (PROP) 315, a raster engine 325, a work distribution crossbar (WDX) 380, a memory management unit (MMU) 390, and one or more Data Processing Clusters (DPCs) 320. It will be appreciated that the GPC 250 of FIG. 3A may include other hardware units in lieu of or in addition to the units shown in FIG. 3A.

In an embodiment, the operation of the GPC 250 is controlled by the pipeline manager 310. The pipeline manager 310 manages the configuration of the one or more DPCs 320 for processing tasks allocated to the GPC 250. In an embodiment, the pipeline manager 310 may configure at least one of the one or more DPCs 320 to implement at least a portion of a graphics rendering pipeline. For example, a DPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the DPCs 320 for processing by the primitive engine 335 or the SM 340. In an embodiment, the pipeline manager 310 may configure at least one of the one or more DPCs 320 to implement a neural network model and/or a computing pipeline.

Figure 3B:
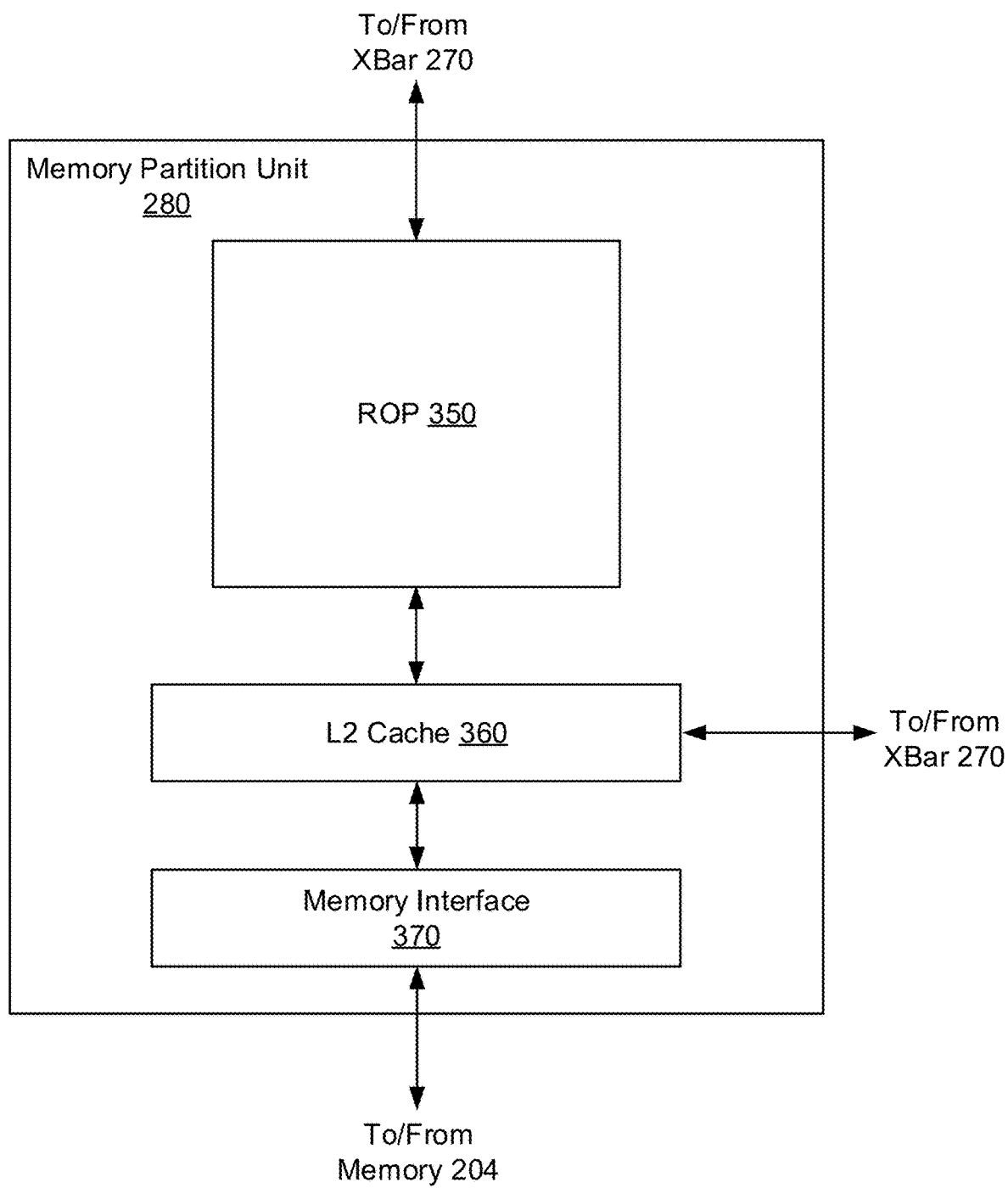
FIG. 3B illustrates a memory partition unit of the parallel processing unit of FIG. 2, in accordance with an embodiment.

The PROP unit 315 is configured to route data generated by the raster engine 325 and the DPCs 320 to a Raster Operations (ROP) unit, described in more detail in conjunction with FIG. 3B. The PROP unit 315 may also be configured to perform optimizations for color blending, organize pixel data, perform address translations, and the like.

The raster engine 325 includes a number of fixed function hardware units configured to perform various raster operations. In an embodiment, the raster engine 325 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 325 comprises fragments to be processed, for example, by a fragment shader implemented within a DPC 320.

Each DPC 320 included in the GPC 250 includes an M-Pipe Controller (MPC) 330, a primitive engine 335, and one or more SMs 340. The MPC 330 controls the operation of the DPC 320, routing packets received from the pipeline manager 310 to the appropriate units in the DPC 320. For example, packets associated with a vertex may be routed to the primitive engine 335, which is configured to fetch vertex attributes associated with the vertex from the memory 204. In contrast, packets associated with a shader program may be transmitted to the SM 340.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In an embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 340 will be described in more detail below in conjunction with FIG. 4A.

The MMU 390 provides an interface between the GPC 250 and the partition unit 280. The MMU 390 may provide translation of virtual addresses into physical addresses, memory protection, and arbitration of memory requests. In an embodiment, the MMU 390 provides one or more translation lookaside buffers (TLBs) for performing translation of virtual addresses into physical addresses in the memory 204.

FIG. 3B illustrates a memory partition unit 280 of the PPU 200 of FIG. 2, in accordance with an embodiment. As shown in FIG. 3B, the memory partition unit 280 includes a Raster Operations (ROP) unit 350, a level two (L2) cache 360, and a memory interface 370. The memory interface 370 is coupled to the memory 204. Memory interface 370 may implement 32, 64, 128, 1024-bit data buses, or the like, for high-speed data transfer. In an embodiment, the PPU 200 incorporates U memory interfaces 370, one memory interface 370 per pair of partition units 280, where each pair of partition units 280 is connected to a corresponding memory device 204. For example, PPU 200 may be connected to up to Y memory devices 204, such as high bandwidth memory stacks or graphics double-data-rate, version 5, synchronous dynamic random access memory, or other types of persistent storage.

In an embodiment, the memory interface 370 implements an HBM2 memory interface and Y equals half U. In an embodiment, the HBM2 memory stacks are located on the same physical package as the PPU 200, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 204 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 200 process very large datasets and/or run applications for extended periods.

In an embodiment, the PPU 200 implements a multi-level memory hierarchy. In an embodiment, the memory partition unit 280 supports a unified memory to provide a single unified virtual address space for CPU and PPU 200 memory, enabling data sharing between virtual memory systems. In an embodiment the frequency of accesses by a PPU 200 to memory located on other processors is traced to ensure that memory pages are moved to the physical memory of the PPU 200 that is accessing the pages more frequently. In an embodiment, the NVLink 210 supports address translation services allowing the PPU 200 to directly access a CPU's page tables and providing full access to CPU memory by the PPU 200.

In an embodiment, copy engines transfer data between multiple PPUs 200 or between PPUs 200 and CPUs. The copy engines can generate page faults for addresses that are not mapped into the page tables. The memory partition unit 280 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 204 or other system memory may be fetched by the memory partition unit 280 and stored in the L2 cache 360, which is located on-chip and is shared between the various GPCs 250. As shown, each memory partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 performs graphics raster operations related to pixel color, such as color compression, pixel blending, and the like. The ROP unit 350 also implements depth testing in conjunction with the raster engine 325, receiving a depth for a sample location associated with a pixel fragment from the culling engine of the raster engine 325. The depth is tested against a corresponding depth in a depth buffer for a sample location associated with the fragment. If the fragment passes the depth test for the sample location, then the ROP unit 350 updates the depth buffer and transmits a result of the depth test to the raster engine 325. It will be appreciated that the number of partition units 280 may be different than the number of GPCs 250 and, therefore, each ROP unit 350 may be coupled to each of the GPCs 250. The ROP unit 350 tracks packets received from the different GPCs 250 and determines which GPC 250 that a result generated by the ROP unit 350 is routed to through the Xbar 270. Although the ROP unit 350 is included within the memory partition unit 280 in FIG. 3B, in other embodiment, the ROP unit 350 may be outside of the memory partition unit 280. For example, the ROP unit 350 may reside in the GPC 250 or another unit.

Figure 4A:
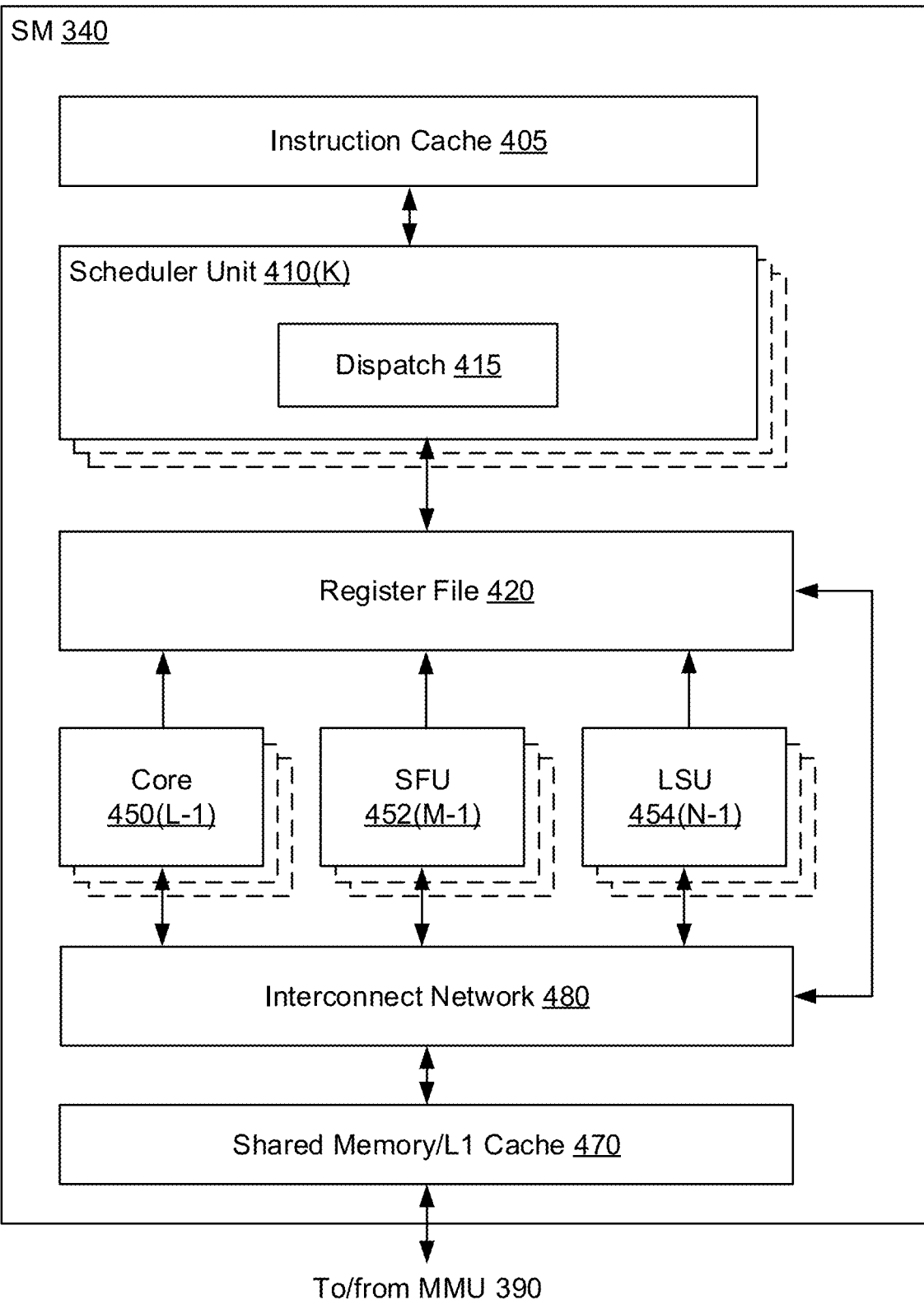
FIG. 4A illustrates the streaming multi-processor of FIG. 3A, in accordance with an embodiment.

FIG. 4A illustrates the streaming multi-processor 340 of FIG. 3A, in accordance with an embodiment. As shown in FIG. 4A, the SM 340 includes an instruction cache 405, one or more scheduler units 410(K), a register file 420, one or more processing cores 450, one or more special function units (SFUs) 452, one or more load/store units (LSUs) 454, an interconnect network 480, a shared memory/L1 cache 470.

As described above, the work distribution unit 225 dispatches tasks for execution on the GPCs 250 of the PPU 200. The tasks are allocated to a particular DPC 320 within a GPC 250 and, if the task is associated with a shader program, the task may be allocated to an SM 340. The scheduler unit 410(K) receives the tasks from the work distribution unit 225 and manages instruction scheduling for one or more thread blocks assigned to the SM 340. The scheduler unit 410(K) schedules thread blocks for execution as warps of parallel threads, where each thread block is allocated at least one warp. In an embodiment, each warp executes 32 threads. The scheduler unit 410(K) may manage a plurality of different thread blocks, allocating the warps to the different thread blocks and then dispatching instructions from the plurality of different cooperative groups to the various functional units (i.e., cores 450, SFUs 452, and LSUs 454) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 415 is configured to transmit instructions to one or more of the functional units. In the embodiment, the scheduler unit 410(K) includes two dispatch units 415 that enable two different instructions from the same warp to be dispatched during each clock cycle. In alternative embodiments, each scheduler unit 410(K) may include a single dispatch unit 415 or additional dispatch units 415.

Each SM 340 includes a register file 420 that provides a set of registers for the functional units of the SM 340. In an embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In an embodiment, the SM 340 includes a large number (e.g., 128, etc.) of distinct processing cores 450. Each core 450 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 450 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 450. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 340 also comprises M SFUs 452 that perform special functions (e.g., attribute evaluation, reciprocal square root, and the like). In an embodiment, the SFUs 452 may include a tree traversal unit configured to traverse a hierarchical tree data structure. In an embodiment, the SFUs 452 may include texture unit configured to perform texture map filtering operations. In an embodiment, the texture units are configured to load texture maps (e.g., a 2D array of texels) from the memory 204 and sample the texture maps to produce sampled texture values for use in shader programs executed by the SM 340. In an embodiment, the texture maps are stored in the shared memory/L1 cache 370. The texture units implement texture operations such as filtering operations using mip-maps (i.e., texture maps of varying levels of detail). In an embodiment, each SM 240 includes two texture units.

Each SM 340 also comprises N LSUs 454 that implement load and store operations between the shared memory/L1 cache 470 and the register file 420. Each SM 340 includes an interconnect network 480 that connects each of the functional units to the register file 420 and the LSU 454 to the register file 420, shared memory/L1 cache 470. In an embodiment, the interconnect network 480 is a crossbar that can be configured to connect any of the functional units to any of the registers in the register file 420 and connect the LSUs 454 to the register file and memory locations in shared memory/L1 cache 470.

The shared memory/L1 cache 470 is an array of on-chip memory that allows for data storage and communication between the SM 340 and the primitive engine 335 and between threads in the SM 340. In an embodiment, the shared memory/L1 cache 470 comprises 128 KB of storage capacity and is in the path from the SM 340 to the partition unit 280. The shared memory/L1 cache 470 can be used to cache reads and writes. One or more of the shared memory/L1 cache 470, L2 cache 360, and memory 204 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 470 enables the shared memory/L1 cache 470 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 2, are bypassed, creating a much simpler programming model. In the general purpose parallel computation configuration, the work distribution unit 225 assigns and distributes blocks of threads directly to the DPCs 320. The threads in a block execute the same program, using a unique thread ID in the calculation to ensure each thread generates unique results, using the SM 340 to execute the program and perform calculations, shared memory/L1 cache 470 to communicate between threads, and the LSU 454 to read and write global memory through the shared memory/L1 cache 470 and the memory partition unit 280. When configured for general purpose parallel computation, the SM 340 can also write commands that the scheduler unit 220 can use to launch new work on the DPCs 320.

The PPU 200 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 200 is embodied on a single semiconductor substrate. In another embodiment, the PPU 200 is included in a system-on-a-chip (SoC) along with one or more other devices such as additional PPUs 200, the memory 204, a reduced instruction set computer (RISC) CPU, a memory management unit (MMU), a digital-to-analog converter (DAC), and the like.

In an embodiment, the PPU 200 may be included on a graphics card that includes one or more memory devices 204. The graphics card may be configured to interface with a PCIe slot on a motherboard of a desktop computer. In yet another embodiment, the PPU 200 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 4B:
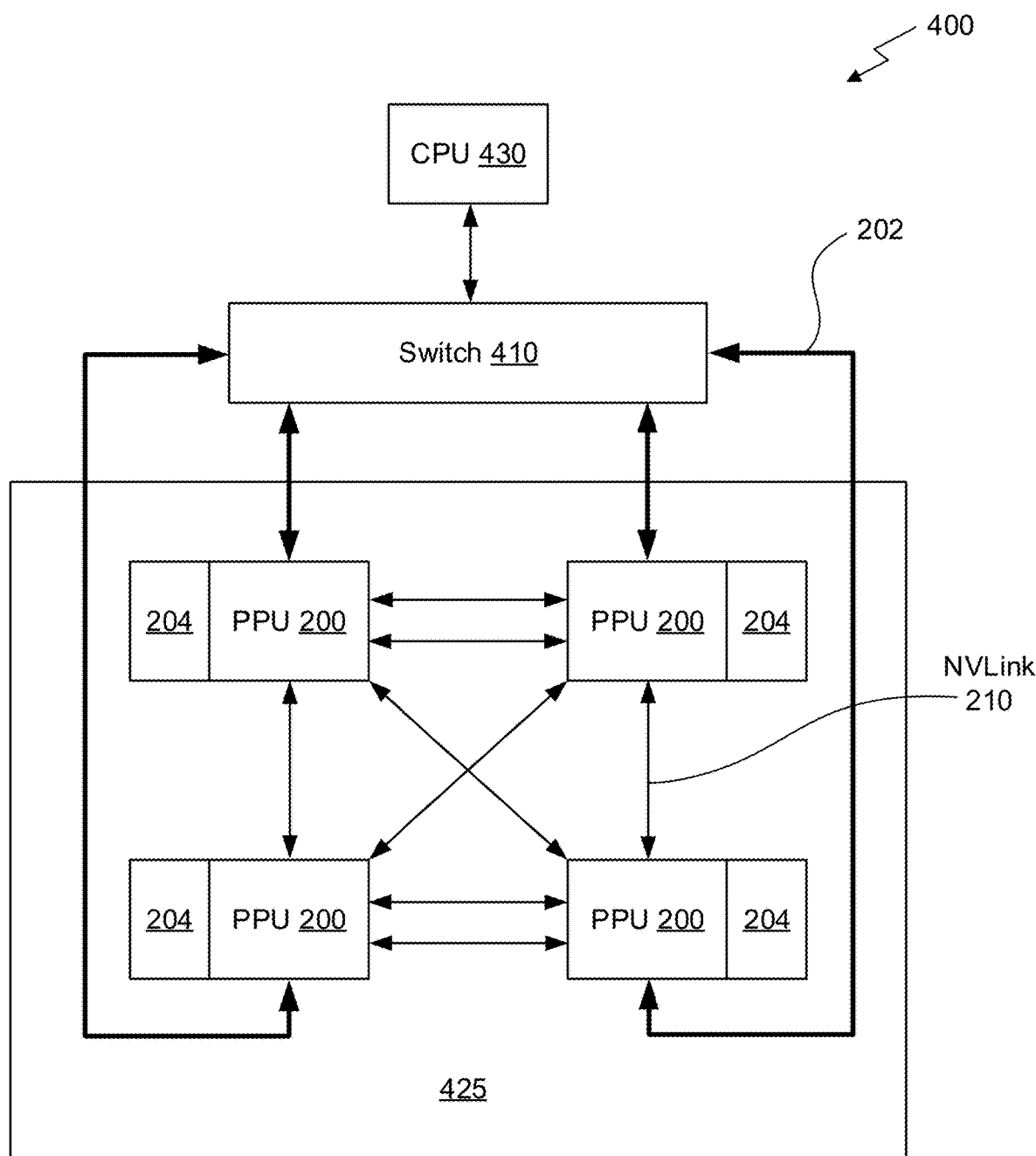
FIG. 4B is a conceptual diagram of a processing system implemented using the PPU of FIG. 2, in accordance with an embodiment.

FIG. 4B is a conceptual diagram of a processing system 400 implemented using the PPU 200 of FIG. 2, in accordance with an embodiment. The exemplary system 465 may be configured to implement the method 100 shown in FIG. 1. The processing system 400 includes a CPU 430, switch 410, and multiple PPUs 200 each and respective memories 204. The NVLink 210 provides high-speed communication links between each of the PPUs 200. Although a particular number of NVLink 210 and interconnect 202 connections are illustrated in FIG. 4B, the number of connections to each PPU 200 and the CPU 430 may vary. The switch 410 interfaces between the interconnect 202 and the CPU 430. The PPUs 200, memories 204, and NVLinks 210 may be situated on a single semiconductor platform to form a parallel processing module 425. In an embodiment, the switch 410 supports two or more protocols to interface between various different connections and/or links.

In another embodiment (not shown), the NVLink 210 provides one or more high-speed communication links between each of the PPUs 200 and the CPU 430 and the switch 410 interfaces between the interconnect 202 and each of the PPUs 200. The PPUs 200, memories 204, and interconnect 202 may be situated on a single semiconductor platform to form a parallel processing module 425. In yet another embodiment (not shown), the interconnect 202 provides one or more communication links between each of the PPUs 200 and the CPU 430 and the switch 410 interfaces between each of the PPUs 200 using the NVLink 210 to provide one or more high-speed communication links between the PPUs 200. In another embodiment (not shown), the NVLink 210 provides one or more high-speed communication links between the PPUs 200 and the CPU 430 through the switch 410. In yet another embodiment (not shown), the interconnect 202 provides one or more communication links between each of the PPUs 200 directly. One or more of the NVLink 210 high-speed communication links may be implemented as a physical NVLink interconnect or either an on-chip or on-die interconnect using the same protocol as the NVLink 210.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 425 may be implemented as a circuit board substrate and each of the PPUs 200 and/or memories 204 may be packaged devices.

In an embodiment, the CPU 430, switch 410, and the parallel processing module 425 are situated on a single semiconductor platform.

In an embodiment, the signaling rate of each NVLink 210 is 20 to 25 Gigabits/second and each PPU 200 includes six NVLink 210 interfaces (as shown in FIG. 4B, five NVLink 210 interfaces are included for each PPU 200). Each NVLink 210 provides a data transfer rate of 25 Gigabytes/second in each direction, with six links providing 300 Gigabytes/second. The NVLinks 210 can be used exclusively for PPU-to-PPU communication as shown in FIG. 4B, or some combination of PPU-to-PPU and PPU-to-CPU, when the CPU 430 also includes one or more NVLink 210 interfaces.

In an embodiment, the NVLink 210 allows direct load/store/atomic access from the CPU 430 to each PPU's 200 memory 204. In an embodiment, the NVLink 210 supports coherency operations, allowing data read from the memories 204 to be stored in the cache hierarchy of the CPU 430, reducing cache access latency for the CPU 430. In an embodiment, the NVLink 210 includes support for Address Translation Services (ATS), allowing the PPU 200 to directly access page tables within the CPU 430. One or more of the NVLinks 210 may also be configured to operate in a low-power mode.

Figure 4C:
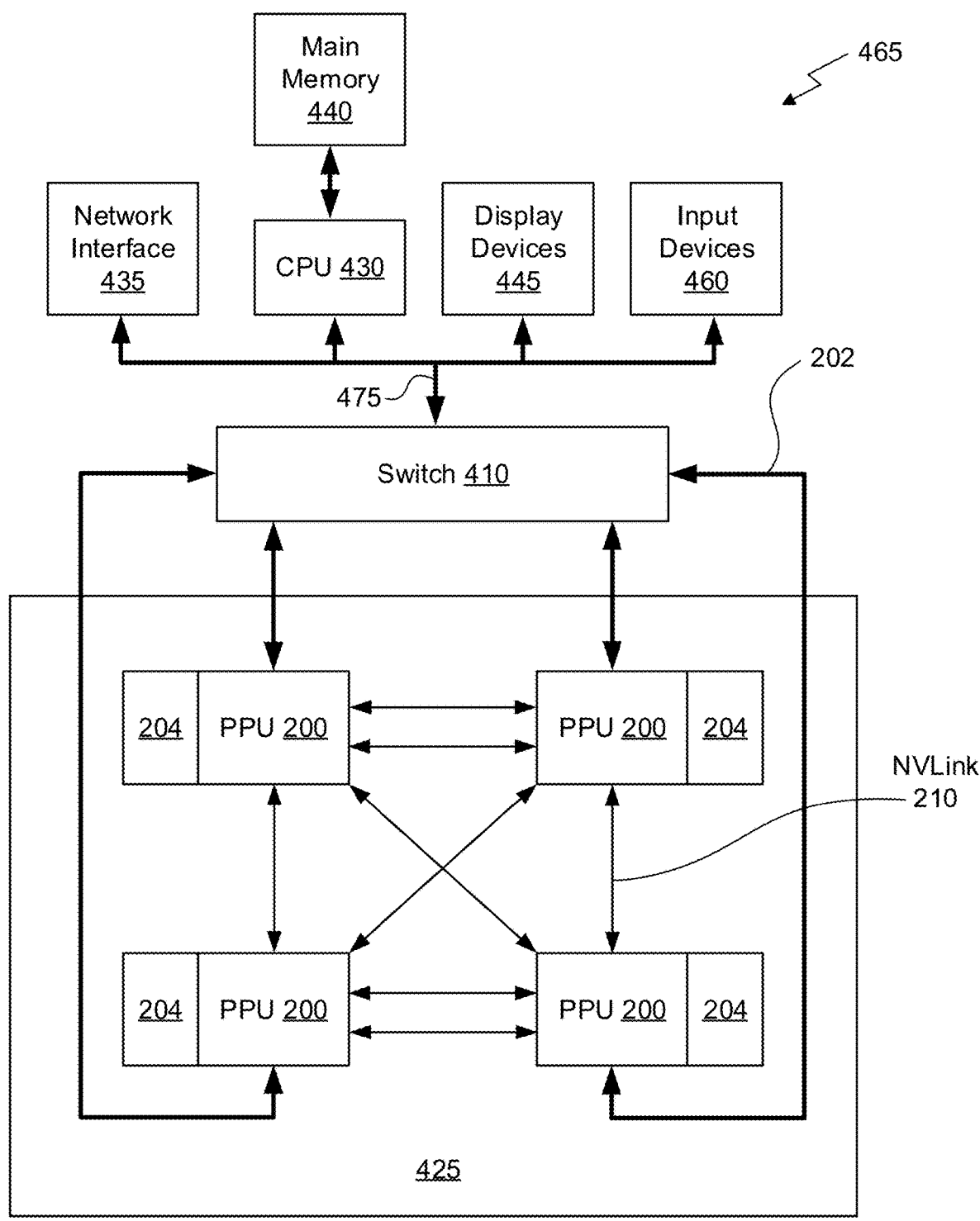
FIG. 4C illustrates an exemplary system in which the various architecture and/or functionality of the various previous embodiments may be implemented.

FIG. 4C illustrates an exemplary system 465 in which the various architecture and/or functionality of the various previous embodiments may be implemented. The exemplary system 465 may be configured to implement the method 100 shown in FIG. 1.

As shown, a system 465 is provided including at least one central processing unit 430 that is connected to a communication bus 475. The communication bus 475 may be implemented using any suitable protocol, such as PCI (Peripheral Component Interconnect), PCI-Express, AGP (Accelerated Graphics Port), HyperTransport, or any other bus or point-to-point communication protocol(s). The system 465 also includes a main memory 440. Control logic (software) and data are stored in the main memory 440 which may take the form of random access memory (RAM).

The system 465 also includes input devices 460, the parallel processing system 425, and display devices 445, i.e. a conventional CRT (cathode ray tube), LCD (liquid crystal display), LED (light emitting diode), plasma display or the like. User input may be received from the input devices 460, e.g., keyboard, mouse, touchpad, microphone, and the like. Each of the foregoing modules and/or devices may even be situated on a single semiconductor platform to form the system 465. Alternately, the various modules may also be situated separately or in various combinations of semiconductor platforms per the desires of the user.

Further, the system 465 may be coupled to a network (e.g., a telecommunications network, local area network (LAN), wireless network, wide area network (WAN) such as the Internet, peer-to-peer network, cable network, or the like) through a network interface 435 for communication purposes.

The system 465 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 440 and/or the secondary storage. Such computer programs, when executed, enable the system 465 to perform various functions. The memory 440, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 465 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In an embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 5:
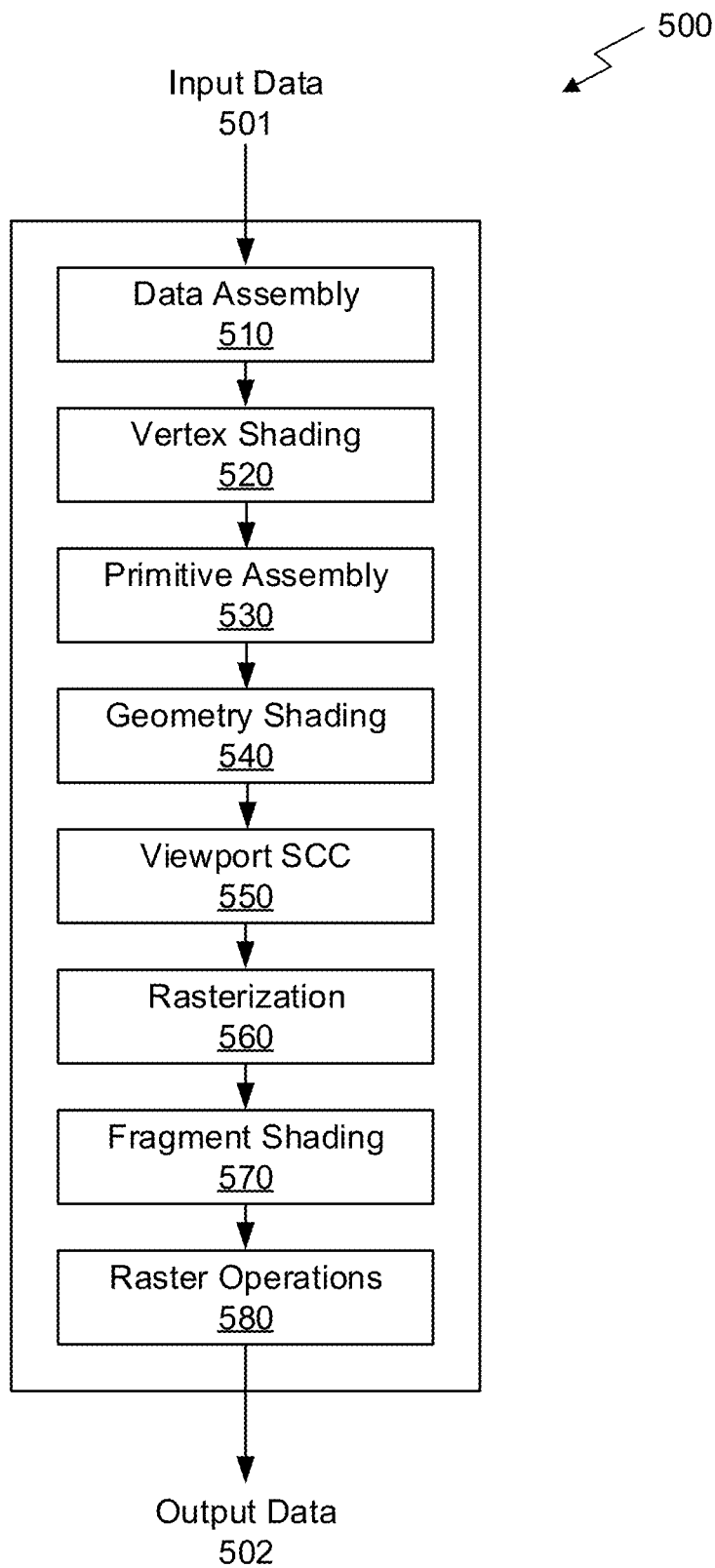
FIG. 5 is a conceptual diagram of a graphics processing pipeline implemented by the PPU of FIG. 2, in accordance with an embodiment.

FIG. 5 is a conceptual diagram of a graphics processing pipeline 500 implemented by the PPU 200 of FIG. 2, in accordance with an embodiment. The graphics processing pipeline 500 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 500 receives input data 501 that is transmitted from one stage to the next stage of the graphics processing pipeline 500 to generate output data 502. In an embodiment, the graphics processing pipeline 500 may represent a graphics processing pipeline defined by the OpenGL® API. As an option, the graphics processing pipeline 500 may be implemented in the context of the functionality and architecture of the previous Figures and/or any subsequent Figure(s).

As shown in FIG. 5, the graphics processing pipeline 500 comprises a pipeline architecture that includes a number of stages. The stages include, but are not limited to, a data assembly stage 510, a vertex shading stage 520, a primitive assembly stage 530, a geometry shading stage 540, a viewport scale, cull, and clip (VSCC) stage 550, a rasterization stage 560, a fragment shading stage 570, and a raster operations stage 580. In an embodiment, the input data 501 comprises commands that configure the processing units to implement the stages of the graphics processing pipeline 500 and geometric primitives (e.g., points, lines, triangles, quads, triangle strips or fans, etc.) to be processed by the stages. The output data 502 may comprise pixel data (i.e., color data) that is copied into a frame buffer or other type of surface data structure in a memory.

The data assembly stage 510 receives the input data 501 that specifies vertex data for high-order surfaces, primitives, or the like. The data assembly stage 510 collects the vertex data in a temporary storage or queue, such as by receiving a command from the host processor that includes a pointer to a buffer in memory and reading the vertex data from the buffer. The vertex data is then transmitted to the vertex shading stage 520 for processing.

The vertex shading stage 520 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 520 may manipulate individual vertex attributes such as position, color, texture coordinates, and the like. In other words, the vertex shading stage 520 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 520 generates transformed vertex data that is transmitted to the primitive assembly stage 530.

The primitive assembly stage 530 collects vertices output by the vertex shading stage 520 and groups the vertices into geometric primitives for processing by the geometry shading stage 540. For example, the primitive assembly stage 530 may be configured to group every three consecutive vertices as a geometric primitive (i.e., a triangle) for transmission to the geometry shading stage 540. In some embodiments, specific vertices may be reused for consecutive geometric primitives (e.g., two consecutive triangles in a triangle strip may share two vertices). The primitive assembly stage 530 transmits geometric primitives (i.e., a collection of associated vertices) to the geometry shading stage 540.

The geometry shading stage 540 processes geometric primitives by performing a set of operations (i.e., a geometry shader or program) on the geometric primitives. Tessellation operations may generate one or more geometric primitives from each geometric primitive. In other words, the geometry shading stage 540 may subdivide each geometric primitive into a finer mesh of two or more geometric primitives for processing by the rest of the graphics processing pipeline 500. The geometry shading stage 540 transmits geometric primitives to the viewport SCC stage 550.

In an embodiment, the graphics processing pipeline 500 may operate within a streaming multiprocessor and the vertex shading stage 520, the primitive assembly stage 530, the geometry shading stage 540, the fragment shading stage 570, and/or hardware/software associated therewith, may sequentially perform processing operations. Once the sequential processing operations are complete, in an embodiment, the viewport SCC stage 550 may utilize the data. In an embodiment, primitive data processed by one or more of the stages in the graphics processing pipeline 500 may be written to a cache (e.g. L1 cache, a vertex cache, etc.). In this case, in an embodiment, the viewport SCC stage 550 may access the data in the cache. In an embodiment, the viewport SCC stage 550 and the rasterization stage 560 are implemented as fixed function circuitry.

The viewport SCC stage 550 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 560.

The rasterization stage 560 converts the 3D geometric primitives into 2D fragments (e.g. capable of being utilized for display, etc.). The rasterization stage 560 may be configured to utilize the vertices of the geometric primitives to setup a set of plane equations from which various attributes can be interpolated. The rasterization stage 560 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 560 generates fragment data (i.e., interpolated vertex attributes associated with a particular sample location for each covered pixel) that are transmitted to the fragment shading stage 570.

The fragment shading stage 570 processes fragment data by performing a set of operations (i.e., a fragment shader or a program) on each of the fragments. The fragment shading stage 570 may generate pixel data (i.e., color values) for the fragment such as by performing lighting operations or sampling texture maps using interpolated texture coordinates for the fragment. The fragment shading stage 570 generates pixel data that is transmitted to the raster operations stage 580.

The raster operations stage 580 may perform various operations on the pixel data such as performing alpha tests, stencil tests, and blending the pixel data with other pixel data corresponding to other fragments associated with the pixel. When the raster operations stage 580 has finished processing the pixel data (i.e., the output data 502), the pixel data may be written to a render target such as a frame buffer, a color buffer, or the like.

It will be appreciated that one or more additional stages may be included in the graphics processing pipeline 500 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 540). Other types of graphics processing pipelines are contemplated as being within the scope of the present disclosure. Furthermore, any of the stages of the graphics processing pipeline 500 may be implemented by one or more dedicated hardware units within a graphics processor such as PPU 200. Other stages of the graphics processing pipeline 500 may be implemented by programmable hardware units such as the SM 340 of the PPU 200.

The graphics processing pipeline 500 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 200. The API provides an abstraction for a programmer that lets a programmer utilize specialized graphics hardware, such as the PPU 200, to generate the graphical data without requiring the programmer to utilize the specific instruction set for the PPU 200. The application may include an API call that is routed to the device driver for the PPU 200. The device driver interprets the API call and performs various operations to respond to the API call. In some instances, the device driver may perform operations by executing instructions on the CPU. In other instances, the device driver may perform operations, at least in part, by launching operations on the PPU 200 utilizing an input/output interface between the CPU and the PPU 200. In an embodiment, the device driver is configured to implement the graphics processing pipeline 500 utilizing the hardware of the PPU 200.

Various programs may be executed within the PPU 200 in order to implement the various stages of the graphics processing pipeline 500. For example, the device driver may launch a kernel on the PPU 200 to perform the vertex shading stage 520 on one SM 340 (or multiple SMs 340). The device driver (or the initial kernel executed by the PPU 300) may also launch other kernels on the PPU 300 to perform other stages of the graphics processing pipeline 500, such as the geometry shading stage 540 and the fragment shading stage 570. In addition, some of the stages of the graphics processing pipeline 500 may be implemented on fixed unit hardware such as a rasterizer or a data assembler implemented within the PPU 300. It will be appreciated that results from one kernel may be processed by one or more intervening fixed function hardware units before being processed by a subsequent kernel on an SM 340.

Machine Learning

Deep neural networks (DNNs) developed on processors, such as the PPU 200 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 200. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 200 is a computing platform capable of delivering performance required for deep neural network-based artificial intelligence and machine learning applications.

Real-Time Ray-Traced Water Surface Caustics

Figure 6:
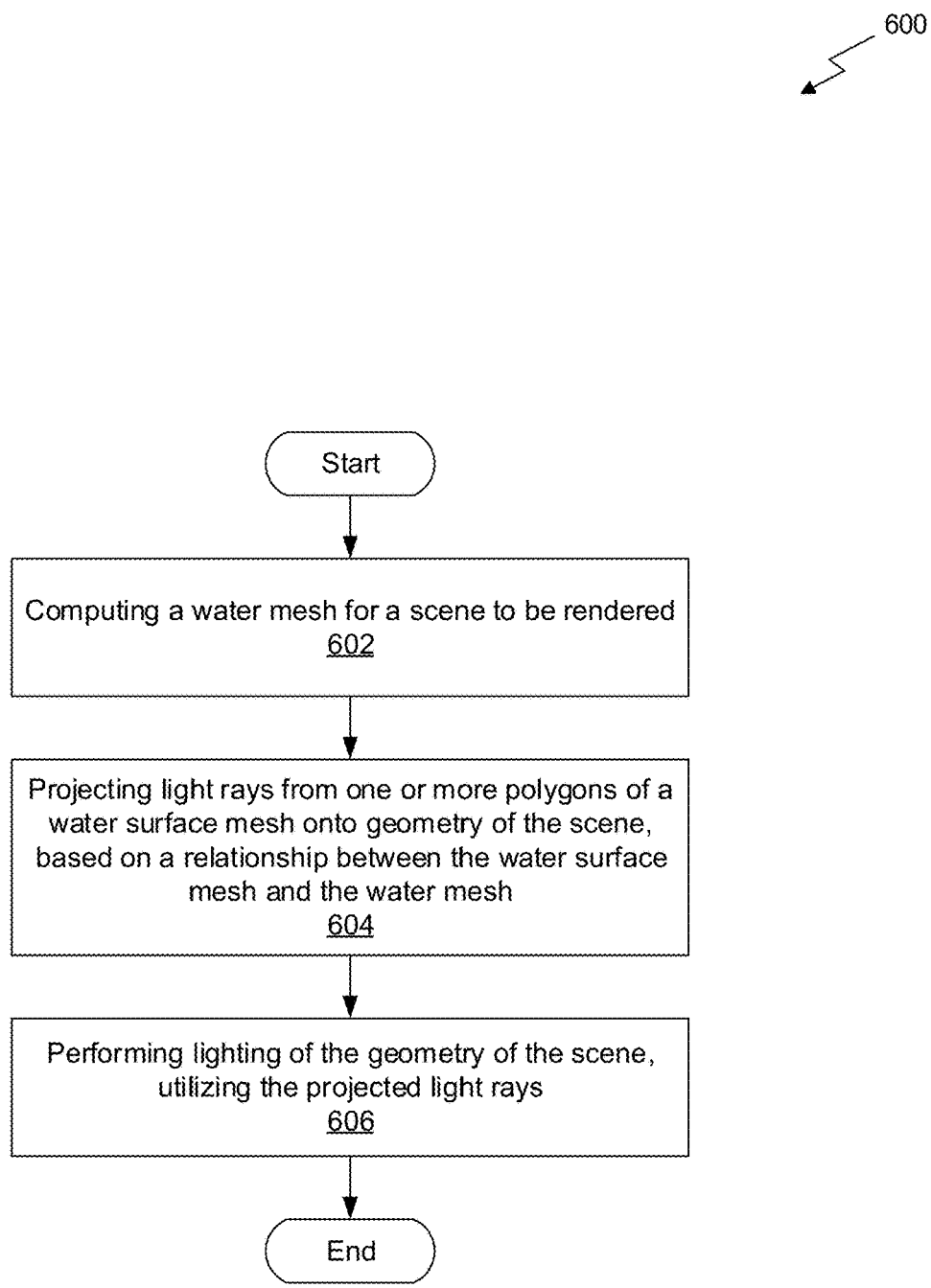
FIG. 6 illustrates a flowchart of a method for implementing real-time ray-traced water surface caustics, in accordance with one embodiment.

FIG. 6 illustrates a flowchart of a method 600 for implementing real-time ray-traced water surface caustics, in accordance with an embodiment. Although method 600 is described in the context of a processing unit, the method 600 may also be performed by a program, custom circuitry, or by a combination of custom circuitry and a program. For example, the method 600 may be executed by a GPU (graphics processing unit), CPU (central processing unit), or any processor capable of performing parallel path space filtering by hashing. Furthermore, persons of ordinary skill in the art will understand that any system that performs method 600 is within the scope and spirit of embodiments of the present invention.

As shown in operation 602, a water mesh is computed for a scene to be rendered. In one embodiment, the water mesh may be a lighting mesh that includes a refracted or reflected mesh. For example, the lighting mesh may represent a mesh formed by refraction and/or reflection. In another embodiment, a water surface mesh may be determined for a scene to be rendered. In yet another embodiment, a ray may be determined for each vertex of the water surface mesh. In still another embodiment, the water mesh may include a refracted water mesh that is computed utilizing refracted rays for each vertex of the water surface mesh. In another embodiment, the water mesh may include a reflected water mesh that is computed utilizing reflected rays for each vertex of the water surface mesh.

Additionally, as shown in operation 604, light rays are projected from one or more polygons of a water surface mesh onto geometry of the scene, based on a relationship between the water surface mesh and the water mesh. In one embodiment, a compression ratio may be determined for each polygon of the water surface mesh. In another embodiment, light rays may be projected from one or more polygons of the water surface mesh onto scene geometry, based on the compression ratio computed for each polygon of the water surface mesh.

Further, as shown in operation 606, lighting of the geometry of the scene is performed, utilizing the projected light rays. In one embodiment, the light rays may include reflected light rays that are projected from one or more polygons of a water surface mesh onto above-water geometry of the scene, and lighting of the above-water geometry of the scene may be performed, utilizing the projected reflected light rays. In another embodiment, the light rays may include refracted light rays that are projected from one or more polygons of a water surface mesh onto underwater geometry of the scene, and lighting of the underwater geometry of the scene may be performed, utilizing the projected light rays.

In this way, a refracted water mesh may be used as a guiding mesh to determine a number and location of refracted or reflected rays to be projected/generated from a corresponding water surface mesh of a scene. Additionally, refracted or reflected rays may be projected directly from a water surface mesh, instead of from a light source.

In yet another embodiment, water mesh may be computed, light rays may be projected, and lighting of the geometry of the scene may be performed utilizing a parallel processing unit (PPU) such as the PPU 200 illustrated in FIG. 2.

In one embodiment, a real-time raytracing application programming interface (API) may be used to simplify and innovate on current methods for rendering real-time water surface caustics. It may be assumed that the necessary bounding volume acceleration structures have already been implemented in a game engine to enable other raytracing-based algorithms like raytraced shadows. If desired, the algorithms described below can also be used to render caustics from light that gets reflected by the water surface (e.g., reflected light), as well as refracted light.

Figure 7:
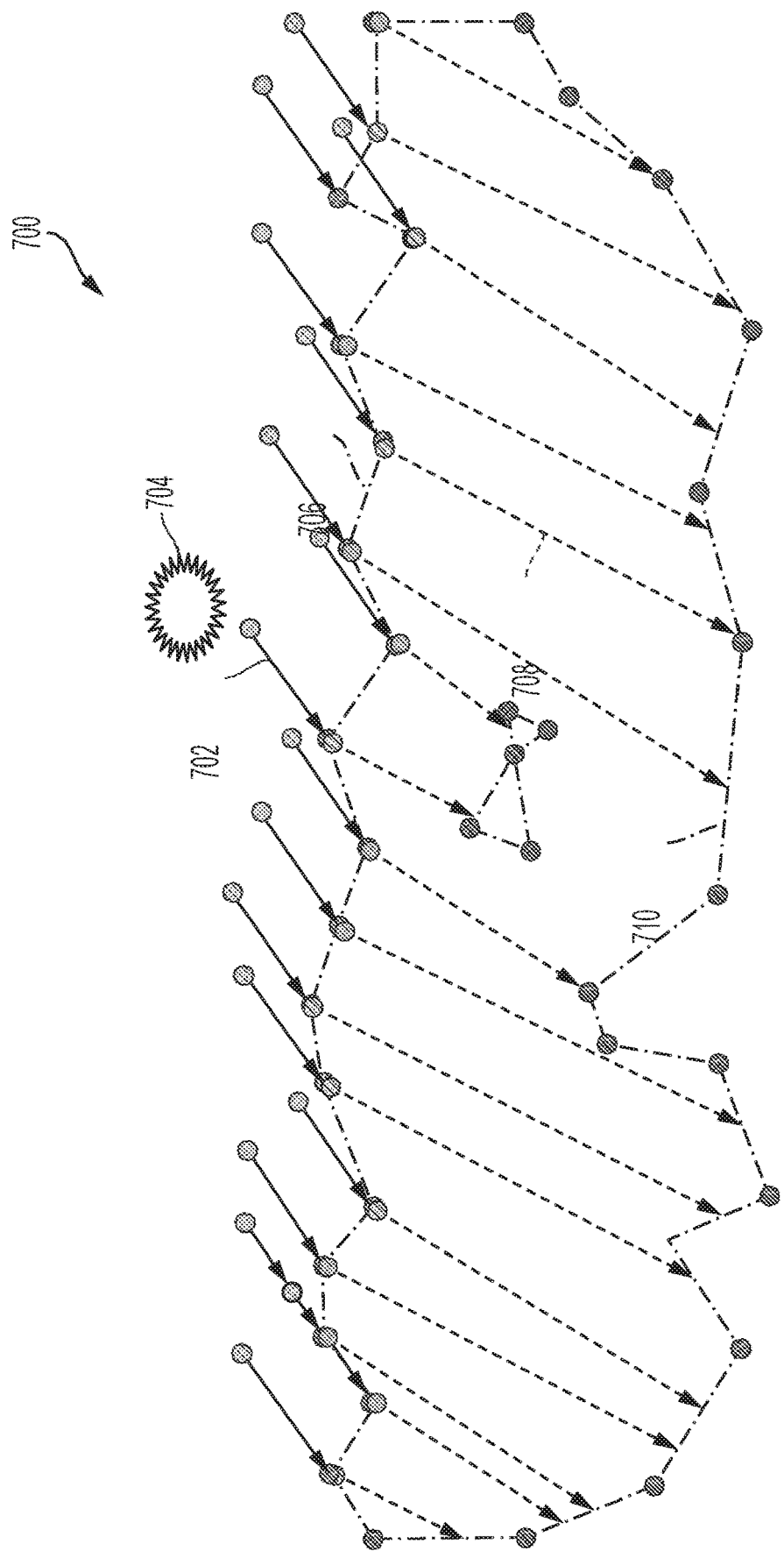
FIG. 7 illustrates an exemplary dynamic underwater three-dimensional (3D) scene, in accordance with one embodiment.

The use of the API may have several benefits over existing solutions with regards to finding the intersections of refracted light rays and a dynamic underwater three-dimensional (3D) scene. This is depicted in the exemplary scene 700 in FIG. 7—the light rays 702 from the light source 704 interact with the water surface 706 and turn into the refracted light rays 708 that shed light on the underwater geometry 710.

Many games shy away from finding intersections with the full game scene, but only compute intersections with a ground plane or the inside of a 3D box. Therefore, the resulting caustics can't hope to render shadows that are the result of many incoherent refracted light rays. Typically, shadows are then generated from a shadow map, which only produces shadows from coherent light rays.

Previous methods for managing refraction need to first render a caustics map, which is an image that contains the refractive geometry. For example, the refractive geometry may include the water surface. However, the method described herein doesn't need this intermediate rendering step. Instead, the ray generation shader directly generates refracted rays on the triangles of the water surface. This conceptually moves the approach described below more towards photon mapping.

Exemplary Algorithm Overview

In one embodiment, the following steps may be used to render raytraced water caustics. In a first step, a refracted water mesh may be computed. For example, for each vertex of the water mesh that represents the geometry of the simulated water surface, a refracted ray R is constructed. This ray starts at the current position of the water vertex and points along the refracted direction of incident light. The refracted water mesh has the same number of vertices and the same triangle count as the water surface. The positions of its vertices are computed by intersecting each ray R with the underwater geometry.

Figure 8:
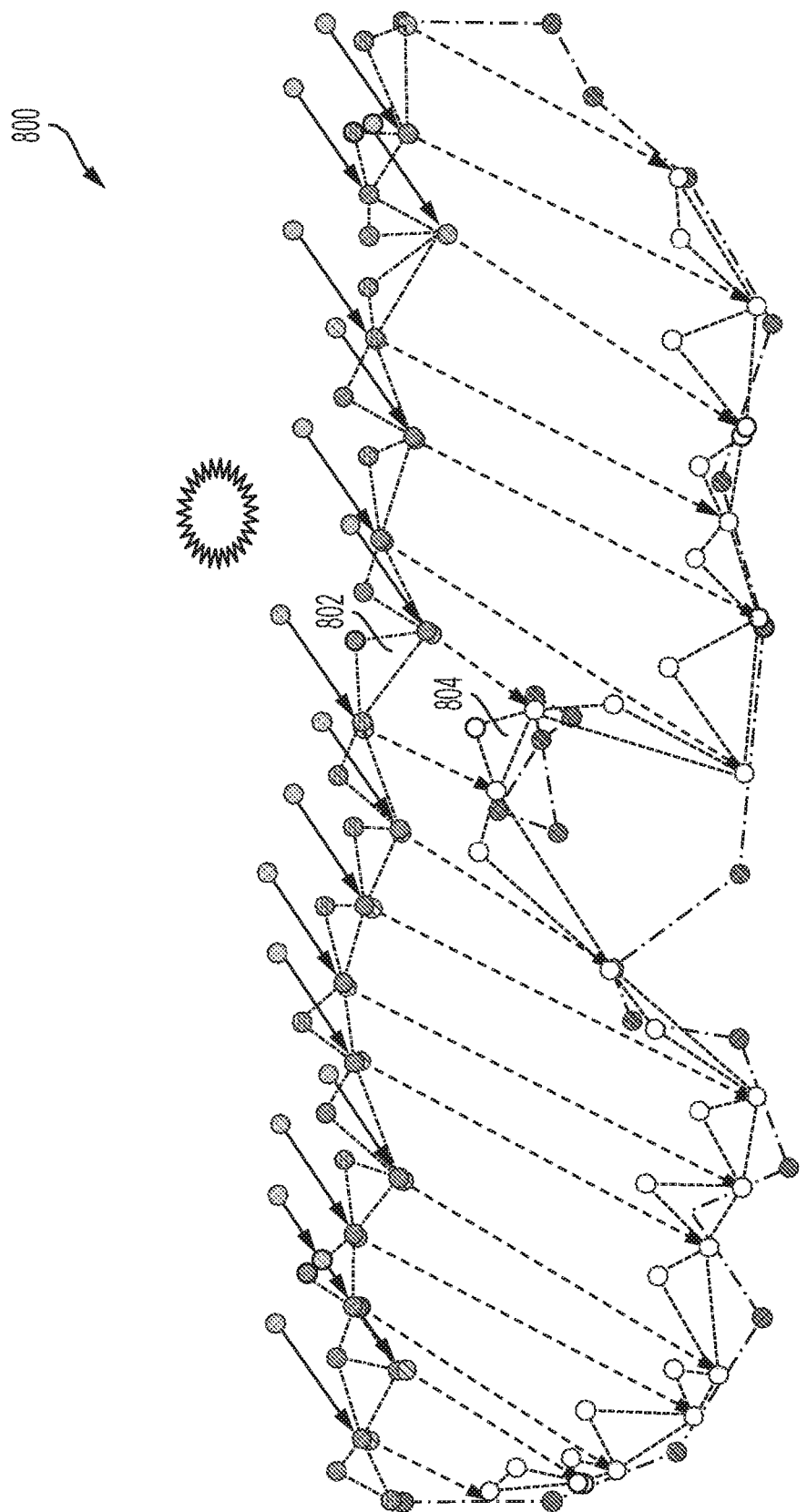
FIG. 8 illustrates an example of rendering raytraced water caustics, in accordance with one embodiment.

FIG. 8 depicts this an example 800 of this process. As shown, every water surface triangle 802 generates a corresponding triangle 804 in the refracted water mesh. Please note that the refracted water mesh does not need to be fine enough to follow every detail of the underwater geometry. It needs to only be detailed enough to facilitate the computation of a high enough quality compression ratio as described below. This step can introduce an error when the water surface is not detailed enough. It is therefore necessary to refine the water surface if errors are detected.

Figure 9:
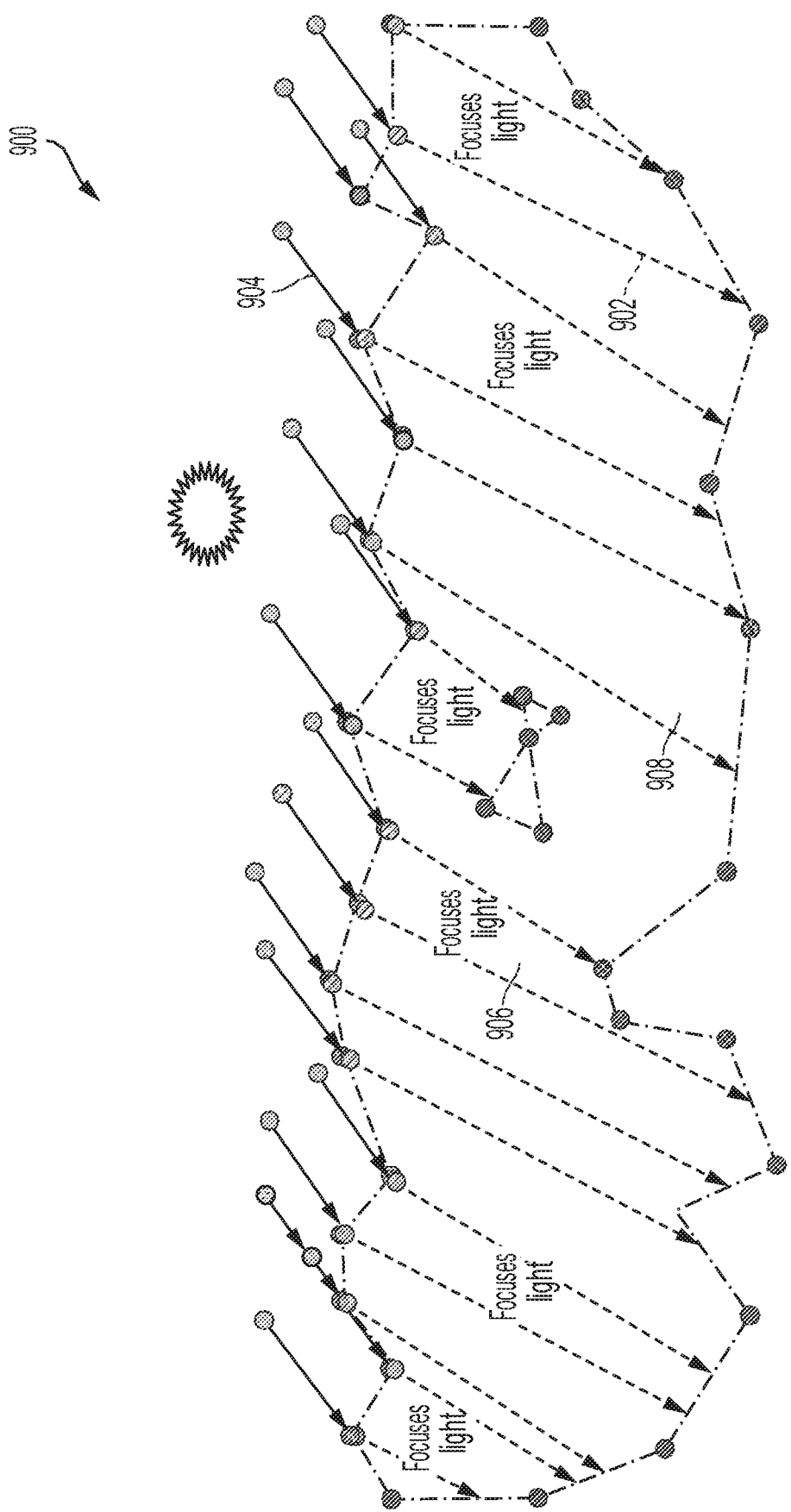
FIG. 9 illustrates an exemplary refraction example, in accordance with one embodiment.

Additionally, in a second step, a compression ratio is computed for each water triangle. For example, FIG. 9 shows an exemplary refraction example 900, according to one embodiment. As shown in FIG. 9, the refractions 902 of the light rays 904 can either focus the light within a narrowing triangular beam 906, or can diffuse the light with an expanding triangular beam 908. As a result, triangles in the refracted water mesh can either have a bigger or a smaller area than their respective water triangle.

In one embodiment, for each triangle the compression ratio is computed as follows and stored in a buffer:

$$\text{compression ratio} = \frac{\text{area}(WaterTriangle)}{\text{area}(RefractedWaterTriangle)}$$

Further, in a third step, refracted light rays may be generated at random locations on the water triangle. For example, for each water triangle, several random world space positions (e.g., samples, etc.) are generated in the triangle. The higher the compression ratio, the more samples are generated. The algorithm to find an adequate sample count for a given compression ratio also considers the on-screen size of the refracted triangle. This means that more samples get generated for triangles that are closer to the viewer.

For each random world space position that can be seen from the light source, a ray (photon) is formed starting at the random position and moving along the interpolated refracted direction. One easy solution to find out if a sample is shadowed (can't be seen by the light source) is to use a shadow map. It is of course also possible to shoot a ray towards the light source. The intersection of each such ray with the underwater scene geometry is then computed.

Each intersection is then projected to screen space. For example, if the position is on-screen, InterlockedAdd( ) may be used to accumulate a brightness value in that screen location. The brightness value that gets accumulated can be scaled by a number of factors, including the compression ratio and/or the amount of light that has been absorbed by the length of the way the ray travels through the water.

Figure 10:
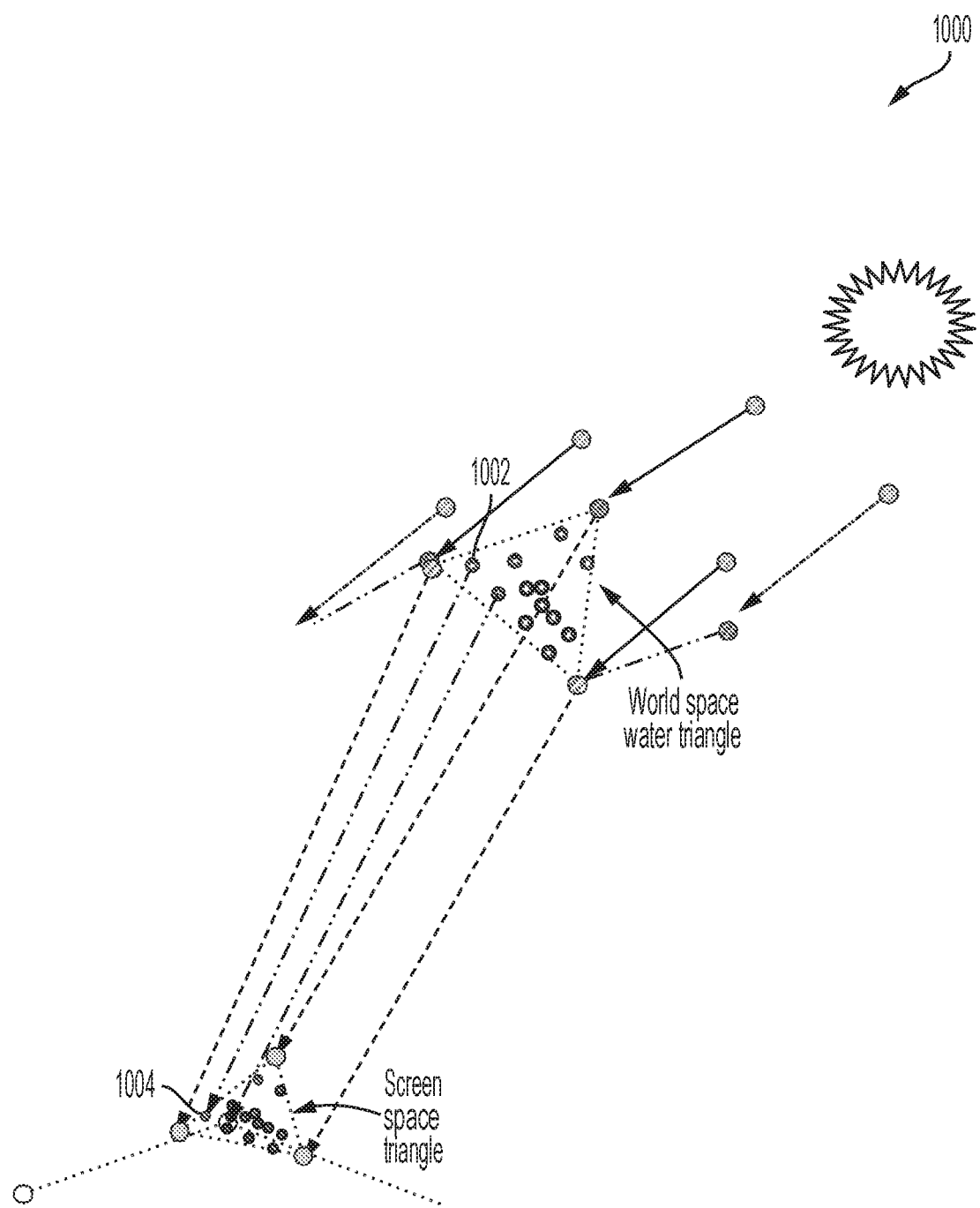
FIG. 10 illustrates an exemplary generation of samples and their corresponding refracted screen space positions, in accordance with one embodiment.

FIG. 10 illustrates an exemplary generation 1000 of samples 1002 and their corresponding refracted screen space positions 1004, according to one embodiment. It is possible to skip the generation of samples for water triangles that are guaranteed not to generate any on screen intersections.

Further still, in a fourth step, the buffer resulting from the generation of the refracted light rays may be denoised to create a denoised and smooth caustics buffer. In a fifth step, the caustics buffer may be used to shed light onto the underwater scene.

Exemplary Implementation

In one embodiment, a DirectX12™ DXR may be used to implement all ray tracing workloads for the first and third steps above. For the first step, DispatchRays( ) is called in a way that each thread traces exactly one refracted ray into the scene. The resulting refracted water mesh is written to a buffer that is read by later steps and uses the same index buffer as the original water mesh.

The second step is implemented as a compute shader. For the third step, DispatchRays( ) is called with enough threads to be able to cast trace the maximum number of rays for every water triangle within an enlarged view frustum. The frustum is enlarged to also capture refracted rays that enter the view frustum via from outside the normal view frustum. The ray generation shader culls (e.g. doesn't call TraceRay( )) if a given thread has no sample to process.

As depicted in Table 1, a simple seed based random number generator is used to generate a set of 'random' barycentric positions inside the current water triangle, according to one embodiment.

TABLE 1

```
float3 RandBarycentrics(inout uint RandSeed)
{
    float s = RandFloat(RandSeed);
    float t = RandFloat(RandSeed);
    [flatten]if (s + t > 1.0f)
        s = 1.0f – s, t = 1.0f – t;
    return float3(1.0f – s – t, s, t);
}
```

One exemplary implementation uses the triangle ID/index as the RandSeed. This choice means that the generated noise is stable across a triangle. Should the number of samples for a triangle change between frames then this does only result in removing or adding samples but never in a change of sample positions for a given triangle.

As described above, the number of samples that is generated is also based on the screen space size of the triangle of the refracted water mesh. As this refracted triangle may be off the screen even if some of the generated rays produce on screen caustics, the maximum screen space size of the refracted triangle and three additional triangles is used.

Figure 11:
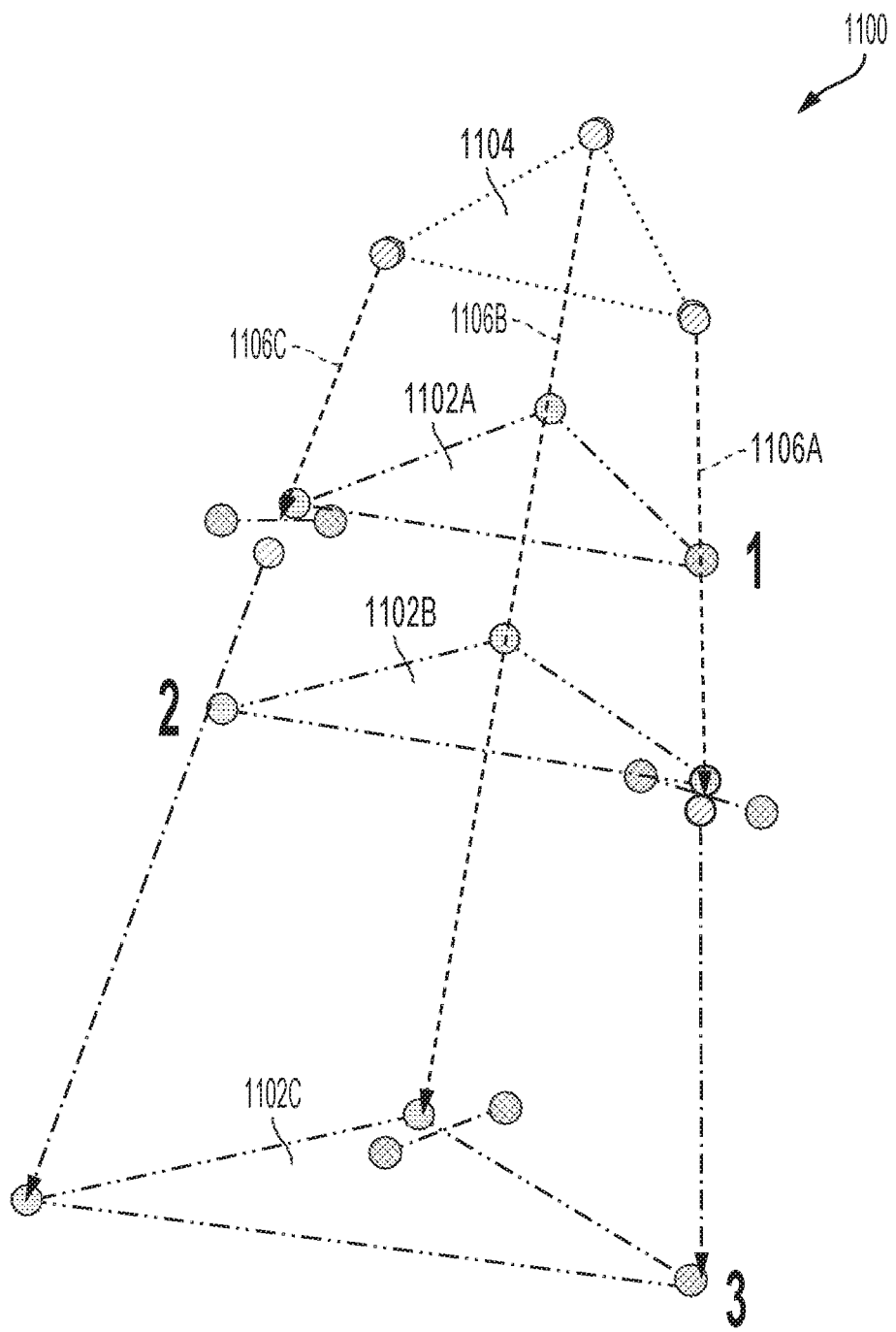
FIG. 11 illustrates an exemplary depiction of three triangles formed at three different intersection points that three vertices/rays that originate from the water surface generate, in accordance with one embodiment.

FIG. 11 illustrates a depiction 1100 of three triangles 1102A-C that get formed at the three different intersection points that the three vertices/rays that originate from the water surface generate. As shown in FIG. 11, the surface triangle 1104 is the triangle at the water surface, and the three rays 1106A-C show scene intersections at very different distances.

In one embodiment, to speed up the fourth step above, the buffer accumulating brightness is implemented as a half-res buffer. This accelerates denoising significantly. Denoising is done through a set of iterated cross-bilateral blurring steps that account for differences in view-space depth, normal and view-space positions.

In one embodiment, regarding multi-bounce caustics, with DXR it is possible to generate one or more secondary rays in the ray generation shader. In this case for each secondary ray versus intersection, it may be necessary to accumulate brightness at the projected screen space position of the intersection.

In another embodiment, regarding volumetric caustics, volumetric caustics may be implemented based on the random ray samples that the above implementations use (e.g., instead of a caustics map, etc.).

Importance Sampled Ray-Traced Real-Time Caustics

In one embodiment, a mesh may be placed in front of the light or around the light for an omnidirectional light. This mesh may be tessellated to a sufficient degree and may be refracted through the transparent parts of the scene. For example, a water mesh may be used. Note that the described method is not limited to water and can perform multiple bounces.

In one embodiment, a refracted mesh is computed, using ray tracing to find vertices in the scene. This is the refracted water surface or a tessellated mesh in front or around the light source. In another embodiment, a ratio of the areas of the original water triangle and the refracted triangle is computed.

If the refracted triangle is smaller and thus brighter, random points are generated on the water triangle. Rays are traced from random points along refracted light directions. Brightness to the screen is determined at intersection points with the scene. Noisy caustics are denoised and used to light the (underwater) scene.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
    determining a water surface mesh for a scene to be rendered, the water surface mesh being a polygon mesh representing a water surface within the scene;
    determining a ray for one or more vertices of the water surface mesh, the ray being at least one of a refracted ray that points along a refracted direction of incident light or a reflected ray that points along a reflected direction of incident light;
    computing a lighting mesh that is at least one of:
        a reflected lighting mesh for the scene to be rendered, where positions of one or more vertices within the reflected lighting mesh are determined by intersecting each reflected ray with above-water geometry in the scene to be rendered, or
        a refracted lighting mesh for the scene to be rendered, where positions of one or more vertices within the refracted lighting mesh are determined by intersecting each refracted ray with below-water geometry in the scene to be rendered;
    determining, based on a calculated relationship between the water surface mesh and the lighting mesh, a number of light rays to be projected from the water surface mesh and locations on the water surface mesh from which to project the light rays;
    projecting the determined number of light rays the determined locations on the water surface mesh onto geometry of the scene; and
    performing lighting of the geometry of the scene, utilizing the projected light rays.

2. The method of claim 1, wherein the number of light rays projected from one or more polygons of the water surface mesh is based on an on-screen size of corresponding polygons within the lighting mesh.

3. The method of claim 1, wherein the determined locations from which to project the light rays include a determined one or more polygons of the water surface mesh, and wherein the light rays are projected from random positions within each polygon of the determined one or more polygons of the water surface mesh.

4. The method of claim 1, further comprising:
    determining, for each polygon of the water surface mesh for which refracted light rays are to be projected, an intersection of each projected light ray with underwater scene geometry, and
    projecting each intersection to a screen space location.

5. The method of claim 4, further comprising accumulating a brightness value for the screen space location in a buffer in response to determining that the screen space location is on-screen.

6. The method of claim 1, further comprising:
    determining, for each polygon of the water surface mesh for which reflected light rays are to be projected, an intersection of each projected light ray with above-water scene geometry, and
    projecting each intersection to a screen space location.

7. The method of claim 6, further comprising accumulating a brightness value for the screen space location in a buffer in response to determining that the screen space location is on-screen.

8. The method of claim 1, wherein the lighting mesh is the refracted lighting mesh, and the light rays are refracted light rays projected from the water surface mesh onto underwater geometry of the scene.

9. The method of claim 1, wherein the lighting mesh is the reflected lighting mesh, and the light rays are reflected light rays projected from the water surface mesh onto above-water geometry of the scene.

10. The method of claim 1, wherein each polygon of the water surface mesh corresponds to a polygon of the lighting mesh, and wherein determining a number of light rays to be projected from the water surface mesh and locations on the water surface mesh from which to project the light rays is performed independently for each polygon of the water surface mesh, based on a calculated relationship between the polygon of the water surface mesh and the corresponding polygon of the lighting mesh.

11. The method of claim 10, wherein the calculated relationship between the polygon of the water surface mesh and the corresponding polygon of the lighting mesh includes a compression ratio between the polygon of the water surface mesh and the corresponding polygon of the lighting mesh.

12. The method of claim 11, wherein polygons of the water surface mesh with a compression ratio less than a predefined threshold have a lower number of light rays projected therefrom than polygons of the water surface mesh with a compression ratio that exceeds the predefined threshold.

13. A system comprising:
    a processor that is configured to:
    determine a water surface mesh for a scene to be rendered, the water surface mesh being a polygon mesh representing a water surface within the scene;
    determine a ray for one or more vertices of the water surface mesh, the ray being at least one of a refracted ray that points along a refracted direction of incident light or a reflected ray that points along a reflected direction of incident light;
    compute a lighting mesh that is at least one of:
        a reflected lighting mesh for the scene to be rendered, where positions of one or more vertices within the reflected lighting mesh are determined by intersecting each reflected ray with above-water geometry in the scene to be rendered, or
        a refracted lighting mesh for the scene to be rendered, where positions of one or more vertices within the refracted lighting mesh are determined by intersecting each refracted ray with below-water geometry in the scene to be rendered;
    determine, based on a calculated relationship between the water surface mesh and the lighting mesh, a number of light rays to be projected from the water surface mesh and locations on the water surface mesh from which to project the light rays;

project the determined number of light rays from the determined locations on the water surface mesh onto geometry of the scene; and perform lighting of the geometry of the scene, utilizing the projected light rays.

14. A method comprising:

determining a water surface mesh for a scene to be rendered, the water surface mesh being a polygon mesh representing a water surface within the scene;

for each vertex of the water surface mesh, determining a refracted ray that points along a refracted direction of incident light;

computing a refracted lighting mesh for the scene, utilizing the refracted rays where positions of one or more vertices within the refracted lighting mesh are determined by intersecting each refracted ray with below-water geometry in the scene to be rendered;

computing a compression ratio for each polygon of the water surface mesh, the compression ratio being between the polygon of the water surface mesh and a corresponding polygon of the refracted lighting mesh;

determining, based on the compression ratio computed for each polygon of the water surface mesh, a number of refracted light rays to be projected from the water surface mesh and one or more polygons of the water surface mesh from which to project the refracted light rays,;

projecting the determined number of refracted light rays from the determined one or more polygons of the water surface mesh onto underwater scene geometry; and performing lighting of the underwater scene geometry, utilizing the projected refracted light rays.

\* \* \* \* \*

UNITED STATES PATENT AND TRADEMARK OFFICE
CERTIFICATE OF CORRECTION

| | | |
|---|---|---|
| PATENT NO. | : 11,010,963 B2 | Page 1 of 1 |
| APPLICATION NO. | : 16/373478 | |
| DATED | : May 18, 2021 | |
| INVENTOR(S) | : Gruen | |

It is certified that error appears in the above-identified patent and that said Letters Patent is hereby corrected as shown below:

In the Claims

Column 25, Line 43 please replace "rays the" with --rays from the--.

Signed and Sealed this
Twenty-third Day of November, 2021

Drew Hirshfeld
*Performing the Functions and Duties of the
Under Secretary of Commerce for Intellectual Property and
Director of the United States Patent and Trademark Office*